United States Patent
Watanabe et al.

(10) Patent No.: US 9,435,057 B2
(45) Date of Patent: Sep. 6, 2016

(54) SIZING AGENT-COATED CARBON FIBER BUNDLE, CARBON FIBER BUNDLE PRODUCTION METHOD, AND PREPREG

(71) Applicant: Toray Industries, Inc., Tokyo (JP)

(72) Inventors: Jun Watanabe, Ehime (JP); Fumihiko Tanaka, Ehime (JP); Haruki Okuda, Ehime (JP); Yuuki Okishima, Ehime (JP); Kengo Hayashida, Ehime (JP); Masafumi Ise, Ehime (JP); Tomoko Ichikawa, Ehime (JP); Naoki Muraki, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/758,621

(22) PCT Filed: Jan. 22, 2014

(86) PCT No.: PCT/JP2014/051248
§ 371 (c)(1),
(2) Date: Jun. 30, 2015

(87) PCT Pub. No.: WO2014/115762
PCT Pub. Date: Jul. 31, 2014

(65) Prior Publication Data
US 2015/0361591 A1    Dec. 17, 2015

(30) Foreign Application Priority Data

Jan. 25, 2013 (JP) ................................. 2013-011882
Jan. 25, 2013 (JP) ................................. 2013-011884
Jan. 25, 2013 (JP) ................................. 2013-011885

(51) Int. Cl.
| | |
|---|---|
| *D01F 11/14* | (2006.01) |
| *D06M 13/11* | (2006.01) |
| *C08J 5/24* | (2006.01) |
| *D01F 9/22* | (2006.01) |
| *D06M 101/40* | (2006.01) |

(52) U.S. Cl.
CPC .................. *D01F 11/14* (2013.01); *C08J 5/24* (2013.01); *D01F 9/22* (2013.01); *D06M 13/11* (2013.01); *D06M 2101/40* (2013.01); *Y10T 428/2918* (2015.01)

(58) Field of Classification Search
CPC ............. C08J 5/24; D01F 11/14; D01F 9/22; D06M 13/11; D06M 101/40
See application file for complete search history.

(56) References Cited

U.S. PATENT DOCUMENTS

| | | |
|---|---|---|
| 2008/0166511 A1 | 7/2008 | Honma et al. |
| 2010/0003515 A1 | 1/2010 | Tanaka et al. |

(Continued)

FOREIGN PATENT DOCUMENTS

| | | |
|---|---|---|
| CN | 1946780 | 4/2007 |
| EP | 1413670 | 4/2004 |

(Continued)

OTHER PUBLICATIONS

Supplementary European Search Report dated Jan. 4, 2016 of corresponding European Application No. 14743393.2.

*Primary Examiner* — Megan McCulley
(74) *Attorney, Agent, or Firm* — DLA Piper LLP (US)

(57) ABSTRACT

A sizing agent-coated carbon fiber bundle has a sizing agent containing an aliphatic epoxy compound (C) and an aromatic epoxy compound (D) coated on the carbon fiber bundle, wherein the carbon fiber in the carbon fiber bundle is the one which exhibits, when measured by single-fiber composite fragmentation method, a number of fiber breaks of at least 2.0/mm when apparent single-fiber stress is 15.3 GPa and the number of fiber breaks of up to 1.7/mm when the apparent single-fiber stress is 12.2 GPa.

14 Claims, 1 Drawing Sheet

(56) References Cited

U.S. PATENT DOCUMENTS

| | | |
|---|---|---|
| 2010/0143713 A1 | 6/2010 | Ise et al. |
| 2010/0252439 A1 | 10/2010 | Yoshikawa et al. |
| 2011/0038788 A1 | 2/2011 | Tanaka et al. |
| 2013/0089736 A1 | 4/2013 | Nakayama et al. |
| 2014/0329075 A1 | 11/2014 | Ichikawa et al. |

FOREIGN PATENT DOCUMENTS

| | | |
|---|---|---|
| JP | 11-12874 A | 1/1999 |
| JP | 11-241230 A | 9/1999 |
| JP | 2004-316052 A | 11/2004 |
| JP | 2005-179826 A | 7/2005 |
| JP | 2005-213687 | 8/2005 |
| JP | 2005-256226 | 9/2005 |
| JP | 2008-248219 A | 10/2008 |
| JP | 2008-308776 A | 12/2008 |
| JP | 2008-308777 A | 12/2008 |
| JP | 2009-114578 A | 5/2009 |
| JP | 2010-047865 A | 3/2010 |
| JP | 2010-111957 A | 5/2010 |
| WO | 2009/060793 A1 | 5/2009 |
| WO | 2009/125832 A1 | 10/2009 |
| WO | 2012/002266 A1 | 1/2012 |
| WO | 2013/099707 A1 | 7/2013 |

SIZING AGENT-COATED CARBON FIBER BUNDLE, CARBON FIBER BUNDLE PRODUCTION METHOD, AND PREPREG

TECHNICAL FIELD

This disclosure relates to a carbon fiber bundle having a sizing agent coated thereon (hereinafter referred to as a sizing agent-coated carbon fiber bundle) and a prepreg. More specifically, the disclosure relates to a sizing agent-coated carbon fiber bundle and a prepreg which can be used in producing a carbon fiber-reinforced composite material having favorable mechanical properties.

BACKGROUND

Carbon fiber has been used in the application of aircraft since it has high specific strength and specific modulus. More specifically, carbon fiber has been used as a fiber for reinforcing fiber-reinforced composite materials and contributed to weight reduction of aircraft. A recent growing trend is wider use of the member including the carbon fiber and use of the carbon fiber in a larger member. The most effective means for weight reduction of aircraft may be improvement of the carbon fiber in the aspect of tensile modulus which controls the rigidity of the carbon fiber-reinforced composite material. However, there is also a requirement for a good balance between a wide variety of mechanical properties including tensile and compressive strength and open hole tensile and compressive strength as a carbon fiber-reinforced composite material. In particular, when the carbon fiber-reinforced composite material is used for aircraft applications, the open hole tensile strength is more important than the tensile strength of the unidirectional carbon fiber-reinforced composite material since use of a drilled pseudo-isotropic material with a fastener is prevalent.

There are many factors that influence the open hole tensile strength, and the mechanism of strength development involves many unclear aspects. However, the general conception of the effects of the carbon fiber on the open hole tensile strength has been such that the open hole tensile strength is proportional to the tensile strength of resin-impregnated strands of the carbon fiber. The "tensile strength of resin-impregnated strands" is an index adopted in view of the convenience of examining the strength potential of the carbon fiber which is the reinforcing fiber. More specifically, the "tensile strength of resin-impregnated strands" is the tensile strength of the simple unidirectional carbon fiber-reinforced composite material prepared by impregnating a particular epoxy resin (hereinafter referred to as strength of the unidirectional composite material).

Some investigations have examined the properties of carbon fibers for the purpose of improving open hole tensile strength of the carbon fiber-reinforced composite material (Japanese Unexamined Patent Publication (Kokai) No. 2010-047865 and Japanese Unexamined Patent Publication (Kokai) No. 2010-111957). Japanese Unexamined Patent Publication (Kokai) No. 2010-047865 discloses an attempt wherein surface morphology of the carbon fiber and the surface treatment conditions of the carbon fiber are changed to improve the open hole tensile strength of the carbon fiber-reinforced composite material. Japanese Unexamined Patent Publication (Kokai) No. 2010-111957 discloses the idea of controlling spreadability of the carbon fiber and its surface wettability to improve the open hole tensile strength of the carbon fiber-reinforced composite material. The open hole tensile strength, however, remained at a low level.

Recently, some techniques of conducting the carbonization at a high draw tension have also been proposed to improve the tensile modulus of the carbon fiber not by controlling the maximum temperature in the carbonization process (Japanese Unexamined Patent Publication (Kokai) No. 2008-248219, Japanese Unexamined Patent Publication (Kokai) No. 2008-308776, and Japanese Unexamined Patent Publication (Kokai) No. 2008-308777). Japanese Unexamined Patent Publication (Kokai) No. 2008-248219 discloses that, when the polyacrylonitrile polymer used in the production of the carbon fiber has a particular molecular weight distribution, the resulting carbon fiber will exhibit high tensile strength and modulus of the resin-impregnated strands in normal range of conditions. In Japanese Unexamined Patent Publication (Kokai) No. 2008-308776 and Japanese Unexamined Patent Publication (Kokai) No. 2008-308777, the focus is on the tensile modulus of the carbon fiber, and the single-fiber strength of the carbon fiber has not been controlled. In addition, since the draw tension is increased in the process of carbonization the pre-carbonized fiber bundle, loss of the quality has been inevitable and the open hole tensile strength has also remained at a low level.

Japanese Unexamined Patent Publication (Kokai) No. 2004-316052 proposes a technique wherein the precursor fiber bundle of the carbon fiber is subjected to a high level drawing in the oxidation process and the pre-carbonization process in an attempt to improve tensile modulus of resin-impregnated strands. In that technique, however, drawing is conducted before carbonization, and influence on the carbon fiber structure was minimal. Moreover, that technique is not the one controlling the single-fiber strength of the carbon fiber.

Japanese Unexamined Patent Publication (Kokai) No. HEI-11-12874 and Japanese Unexamined Patent Publication (Kokai) No. 2009-114578 propose the technique of interlacing the precursor fiber for the purpose of preventing pseudo-adhesion by the oiling agent in the spinning process. However, that technique was far from simultaneously realizing the tensile strength of resin-impregnated strands and the tensile modulus of resin-impregnated strands at a high level.

Also proposed is a technique wherein single-fiber diameter of the carbon fiber is controlled to the small diameter range to reduce the probability of surface flaw generation to improve single-fiber strength of the carbon fiber (Japanese Unexamined Patent Publication (Kokai) No. HEI-11-241230). While that technique can realize the high tensile strength and modulus of the resin-impregnated strands, variation in the structure between the single-fibers and the associated variation in the strength between the single-fibers are induced in the carbonization process. In addition, fluffing and fiber breakage are induced in the carbonization process, and this inevitably resulted in the inferior operability and unfavorable quality of the resulting carbon fiber bundle.

We found that, when a carbon fiber having an excellent tensile modulus and a particular matrix resin capable of developing very high open hole tensile strength are combined, open hole tensile strength (hereinafter sometimes abbreviated as OHT) of the resulting carbon fiber-reinforced composite material is not improved even if the tensile strength of the resin-impregnated strands of the carbon fiber is increased and, therefore, an approach entirely different from conventional approaches is needed to achieve a carbon fiber-reinforced composite material having a higher open hole tensile strength. Accordingly, it could be helpful to provide a prepreg containing a carbon fiber having an excellent tensile modulus capable of producing a carbon fiber-reinforced composite material having a high open hole tensile strength, and a sizing agent-coated carbon fiber bundle usable in such prepreg.

It could also be helpful to provide a carbon fiber bundle simultaneously having a high tensile strength and a high tensile modulus of the resin-impregnated strands which also has excellent quality.

SUMMARY

We found that the open hole tensile strength of the carbon fiber-reinforced composite material can be improved by controlling single-fiber strength distribution in the high strength (short gauge length) range of the carbon fiber which could not have been clearly measured. We also found that the open hole tensile strength of the carbon fiber-reinforced composite material can be improved by another means, namely, by controlling the bundle strength in long gauge length range of the carbon fiber bundle.

We thus provide:

(I) A sizing agent-coated carbon fiber bundle having a sizing agent containing an aliphatic epoxy compound (C) and an aromatic epoxy compound (D) coated on the carbon fiber bundle, wherein the carbon fiber in the carbon fiber bundle is the one which exhibits, when measured by single-fiber composite fragmentation method, a number of fiber breaks of at least 2.0/mm when apparent single-fiber stress is 15.3 GPa and the number of fiber breaks of up to 1.7/mm when the apparent single-fiber stress is 12.2 GPa.

(II) A sizing agent-coated carbon fiber bundle having a sizing agent coated on the carbon fiber bundle, wherein the carbon fiber in the carbon fiber bundle is the one which exhibits, when measured by single-fiber composite fragmentation method, a number of fiber breaks of at least 2.0/mm when apparent single-fiber stress is 15.3 GPa and the number of fiber breaks of up to 1.3/mm when the apparent single-fiber stress is 12.2 GPa.

(III) A sizing agent-coated carbon fiber bundle having a sizing agent coated on the carbon fiber bundle having an average tearable length of 300 to 710 mm, a tensile strength of resin-impregnated strands of at least 5900 MPa, a tensile modulus of resin-impregnated strands of at least 320 GPa, and a number of broken single-filaments of 0.5 to 3/m, and which is substantially non-twisted.

(IV) A method of producing a carbon fiber bundle comprising the processes of subjecting a precursor fiber bundle comprising a polyacrylonitrile polymer to an oxidation process, a pre-carbonization process, a carbonization process to obtain a carbon fiber bundle, wherein the carbonization process is conducted in an inert atmosphere at a temperature of 1200 to 2000° C. so that tension applied to the pre-carbonized fiber bundle produced by the pre-carbonization in the carbonization process is in the range satisfying the following relation:

9.8≤tension in the carbonization process(mN/dtex)≤−0.0225×(average tearable length of the pre-carbonized fiber bundle(mm))+23.5, wherein the pre-carbonized fiber bundle is substantially non-twisted, and the pre-carbonized fiber bundle has an average tearable length of 150 to 620 mm.

The sizing agent-coated carbon fiber bundle is preferably a sizing agent-coated carbon fiber bundle wherein, when the surface of the sizing agent coated on the carbon fiber is measured by X-ray photoelectron spectroscopy at photoelectron takeoff angle of 15°, ratio (a)/(b) of (a) height of the component in the C1s inner shell spectrum corresponding to the binding energy of 284.6 eV to (b) height of the component in the C1 s inner shell spectrum corresponding to the binding energy of 286.1 eV is 0.50 to 0.90.

We provide a sizing agent-coated carbon fiber bundle and a prepreg capable of producing a carbon fiber-reinforced composite material which has excellent tensile modulus and which exhibits excellent open hole tensile strength. In the prepreg, the carbon fiber-reinforced composite material obtained by the curing exhibits well balanced mechanical properties including tensile modulus and open hole tensile strength, and accordingly, it greatly contributes to the weight reduction of aircraft, and hence, in the improvement of the specific fuel consumption of the aircraft.

According to the method of producing the carbon fiber bundle, a carbon fiber bundle having both the high tensile strength and the high tensile modulus of the resin-impregnated strands as well as has excellent quality is provided.

EXPLANATION OF NUMERALS

Figure 1:
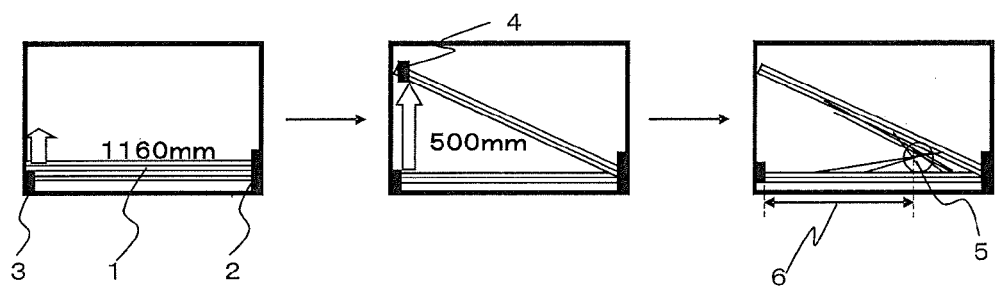
FIG. 1 is a view showing the method used in measuring tearable length.

1: fiber bundle
2: fixed point A
3: fixed point B
4: fixed point C
5: interlacing point
6: tearable length

DETAILED DESCRIPTION

The sizing agent-coated carbon fiber bundle is a sizing agent-coated carbon fiber bundle having a sizing agent containing an aliphatic epoxy compound (C) and an aromatic epoxy compound (D) coated on the carbon fiber bundle, and the carbon fiber in the carbon fiber bundle is the one which exhibits, when measured by single-fiber composite fragmentation method, a number of fiber breaks of at least 2.0/mm when apparent single-fiber stress is 15.3 GPa and the number of fiber breaks of up to 1.7/mm when the apparent single-fiber stress is 12.2 GPa.

With regard to the tensile strength of resin-impregnated strands, the value of this tensile strength is normally estimated by presuming that the load applied to the entire composite material is solely supported by the carbon fiber. Since the carbon fiber strength per fiber cross sectional area is up to 6 to 7 GPa, the relation between probability of the carbon fiber single-fiber breakage and the strength of the carbon fiber-reinforced composite material in the range above such range has never been discussed. However, we found that, in the combination with a particular matrix resin, the single-fiber strength distribution in high strength range has strong influence on the OHT if the OHT of the carbon fiber-reinforced composite material is to be improved.

A conventional technique that has been widely used in evaluating the single-fiber strength distribution of the carbon fiber has been the single-fiber tensile test. However, in the single-fiber tensile test, the single-fibers are fixed at the clumping region by embedding the single-fibers using cyanate adhesive or epoxy adhesive, and stress had also been applied to the fibers in the adhesive and the fiber was often broken in the adhesive. More specifically, we found that the single-fiber tensile test was like a test of pulling the single-fiber out of the adhesive and that the stress was applied to the fiber also in the adhesive resin to the depth of several mm. In other words, in the single-fiber tensile test, the gauge length actually evaluated was substantially longer than the distance between the clumps even if the distance between the clumps was set at less than 5 mm, and the difference between the distance between the clumps and the actual gauge length became even more substantial when the distance between the clumps was reduced. In short, we found that single-fiber strength distribution in the short gauge length range had been left unevaluated.

To deal with such problems, we found a technique to evaluate the single-fiber strength distribution by using the fragmentation test of the single-fiber composites. We found that the result of the fragmentation test of the single-fiber composites was highly consistent with the results of the single-fiber strength distribution calculated from the strength test of the single-fiber having a gauge length of 25 mm, and excellence of the fragmentation test as a method of evaluating the single-fiber strength distribution was thereby demonstrated. We also demonstrated that, when the matrix resin used for the single-fiber composites is adequately selected, and the adhesion strength of the single-fiber-matrix resin interface above certain level is selected, the strength distribution can be evaluated at high accuracy to the short gauge length range of about 1 mm. The accurate strength distribution in such high strength-short gauge length range has never been discussed before.

The "single-fiber composite fragmentation method" is a method wherein the number of fiber breaks is counted at each step of the strain while applying strain to the composite having the carbon fiber single-fiber embedded in the resin (single-fiber composites) in stepwise manner. Examination of the single-fiber strength distribution of the carbon fiber has been thereby enabled. It is to be noted that the details of the measurement using the fragmentation method is described later. To accurately calculate the single-fiber strength from the strain of the single-fiber composite upon fiber breakage, the calculation should be conducted by considering the difference between the strain of the single-fiber composite and the strain of the fiber as well as the modulus of the single-fiber at each fiber strain. However, the modulus of the carbon fiber has a nonlinearity of the modulus that it increases with the increase in the strain, and the accurate fiber stress at the breakage of the fiber is not determined by simple calculation.

Accordingly, use of apparent single-fiber stress for the evaluation of the single-fiber strength distribution of the carbon fiber instead of the accurate fiber stress is convenient. The "apparent single-fiber stress" as used herein is the product of the strain of the single-fiber composites and the modulus of the carbon fiber single-fiber. When fiber breakage occurs, the fiber shows the recovery behavior from the part remote from the part of the fiber breakage, and some parts experience difference in the strain of the single-fiber composites and the fiber strain. Accordingly, an increase in the strain of the single-fiber composite sometimes results in a small increase in the maximum fiber stress, and this results in the difference between the strain of the single-fiber composites and the maximum fiber stress. However, this difference between the apparent single-fiber stress and the maximum fiber stress is usually very small at the number of fiber breaks of up to 1.0/mm. While this difference increases with the number of fiber breaks, the correlation is present between the apparent single-fiber stress and the maximum fiber stress. As described above, use as a scale of the apparent single-fiber stress in the evaluation as a convenient technique is adequate.

The sizing agent-coated carbon fiber bundle is wherein the carbon fiber in the carbon fiber bundle exhibits, when measured by single-fiber composite fragmentation method, a number of fiber breaks of up to 1.7/mm, preferably up to 1.5/mm, more preferably up to 1.3/mm, and most preferably up to 1.0/mm when the apparent single-fiber stress is 12.2 GPa.

The dominant cause for the carbon fiber breakage under the stress of such level is the single-fiber strength of the carbon fiber. We found that high single-fiber strength of the carbon fiber and, in particular, high single-fiber strength at a short fiber length is important in improving the OHT. In other words, when the number of fiber breaks is in excess of 1.7/mm, the OHT will be reduced by the insufficiency in the single-fiber strength of the carbon fiber and, therefore, the number of fiber breaks is preferably up to 1.7/mm. Furthermore, the number of fiber breaks of up to 1.3/mm is more preferable since the single-fiber strength of the carbon fiber will be sufficient and the OHT will improve irrespective of the resin type.

The sizing agent-coated carbon fiber bundle is one wherein the carbon fiber in the carbon fiber bundle exhibits, when measured by single-fiber composite fragmentation method, a number of fiber breaks of up to 0.8/mm, preferably up to 0.7/mm, and more preferably up to 0.5/mm when the apparent single-fiber stress is 10.0 GPa. When the number of fiber breaks is in excess of 0.8/mm, the OHT will be reduced due to the insufficient single-fiber strength of the carbon fiber. When the number of fiber breaks is up to 0.8/mm, the single-fiber strength of the carbon fiber will be high, and fiber breaks in wide area around the hole of the carbon fiber composite material in the OHT test can be suppressed, and this leads to the high OHT.

The sizing agent-coated carbon fiber bundle is one wherein the carbon fiber in the carbon fiber bundle exhibits, when measured by single-fiber composite fragmentation method, a number of fiber breaks of up to 0.3/mm, preferably up to 0.2/mm, and more preferably up to 0.1/mm when the apparent single-fiber stress is 6.8 GPa. When the fiber stress at which the number of fiber breaks is around 0.3/mm is too low, the stress concentration to the fibers in the carbon fiber-reinforced composite material adjacent to the broken fiber is likely to be induced. Accordingly, the high OHT can be maintained by controlling the number of fiber breaks to up to 0.3/mm.

The sizing agent-coated carbon fiber bundle is one wherein the carbon fiber in the carbon fiber bundle exhibits, when measured by single-fiber composite fragmentation method, a number of fiber breaks of up to 1.7/mm, preferably up to 1.5/mm, and more preferably up to 1.0/mm when the strain of the single-fiber composite is 3.6%. When the number of fiber breaks is in excess of 1.7/mm, the OHT decreases due to the insufficient single-fiber strength of the carbon fiber, and a smaller number of fiber breaks is preferable since the smaller number of fiber breaks means higher single-fiber strength of the carbon fiber. Since elongation at break of the unidirectional carbon fiber-reinforced composite material is typically up to 2%, the relation between the probability of the carbon fiber breakage and the strength of the composite material at an elongation higher than such level has never been discussed. We also revealed that, when the OHT is to be increased, the probability of the carbon fiber breakage in the high elongation range has strong influence on the OHT in the combination with particular resin.

The sizing agent-coated carbon fiber bundle is one wherein the carbon fiber in the carbon fiber bundle exhibits, when measured by single-fiber composite fragmentation method, the number of fiber breaks of up to 0.1/mm, preferably up to 0.08/mm, and more preferably up to 0.06/mm when the strain of the single-fiber composite is 2.0%. When the fiber stress at which the number of fiber breaks is around 0.1/mm is too low, the stress concentration to the fibers in the carbon fiber-reinforced composite material adjacent to the broken fiber is likely to be induced. Accordingly, the high OHT can be maintained by controlling the number of fiber breaks to up to 0.1/mm.

The sizing agent-coated carbon fiber bundle is one wherein the carbon fiber in the carbon fiber bundle exhibits, when measured by single-fiber composite fragmentation method, the number of fiber breaks of up to 2.0/mm, preferably up to 2.5/mm, and more preferably up to 3.0/mm when the apparent single-fiber stress is 15.3 GPa. The dominant factor of the carbon fiber breakage in such high stress is conceivably interfacial shear strength at the fiber/resin interface in contrast to the apparent single-fiber stress of 12.2 GPa. The fragmentation method is also capable of examining the interfacial shear strength at the fiber/resin interface in addition to the single-fiber strength of the carbon fiber. In such examination, the Kelly-Tyson model is often used in view of its convenience despite its lack of accuracy. In the fragmentation method, higher saturated number of fiber breaks is said to correspond to the higher interfacial shear strength. Basically, when the interfacial shear strength is high, the strength of the unidirectional carbon fiber-reinforced composite material is also high and improvement in the OHT is thereby enabled. When the number of fiber breaks is less than 2.0/mm, interfacial adhesion between the carbon fiber and the matrix resin will be insufficient and the OTH decreases since the fiber cannot support the stress upon increase of the number of fiber breaks due to the decrease in the interfacial adhesion. When the modulus of the carbon fiber single-fiber is low, the single-fiber composites may become broken before increasing the apparent single-fiber stress to 15.3 GPa and, in such case, the number of fiber breaks at that point may be used when the number of fiber breaks is saturated. The "saturated" as used herein means that the increase in the number of fiber breaks per 1% increase in the strain of the single-fiber composites has become 0.2/mm.

The sizing agent-coated carbon fiber bundle is one wherein the carbon fiber in the carbon fiber bundle exhibits, when measured by single-fiber composite fragmentation method, the number of fiber breaks of up to 2.0/mm, and preferably up to 3.0/mm when the strain of the single-fiber composite is 4.5%. At the strain of the single-fiber composite of 4.5%, the number of fiber breaks is often unsaturated, and the evaluation of the number of fiber breaks substantially at such strain is sufficient for evaluation of the height of interfacial adhesion. When the number of fiber breaks is at least 2.0/mm, and the fiber breakage is induced by reduced interfacial adhesion, the fibers near the part of the fiber breakage will receive the fiber stress, and the high OHT is thereby maintained.

As described above, we demonstrated that both the single-fiber strength distribution of the carbon fiber and the interfacial shear strength of the fiber/resin interface can be investigated by using the fragmentation method. We also found as a result of measuring the sizing agent-coated carbon fiber bundle using the fragmentation method that a carbon fiber-reinforced composite material having a high OHT is obtained when a sizing agent-coated carbon fiber bundle which exhibits a reduced number of breakage at a reduced stress and an increased number of breakage at an increased stress is used.

We also provide a sizing agent-coated carbon fiber bundle having a sizing agent coated on the carbon fiber bundle, wherein the carbon fiber in the carbon fiber bundle is the one which exhibits, when measured by single-fiber composite fragmentation method, a number of fiber breaks of at least 2.0/mm when apparent single-fiber stress is 15.3 GPa and the number of fiber breaks of up to 1.3/mm when the apparent single-fiber stress is 12.2 GPa.

The tensile strength of resin-impregnated strands of the sizing agent-coated carbon fiber bundle is preferably at least 5.9 GPa, more preferably at least 6.4 GPa, still more preferably at least 6.8 GPa, still more preferably at least 7.0 GPa, still more preferably at least 7.2 GPa, and still more preferably at least 7.5 GPa. Alternatively, the tensile modulus of resin-impregnated strands of the carbon fiber is preferably at least 320 GPa, more preferably at least 340 GPa, still more preferably at least 350 GPa. When the carbon fiber strain in the fragmentation method is converted to fiber stress, tensile modulus of resin-impregnated strands is necessary and, essentially, reduced fiber breakage is important even at a high fiber stress, and OHT may be reduced when the tensile modulus of resin-impregnated strands is less than 320 GPa. The tensile strength and the modulus of the carbon fiber strand may be determined by the following procedure according to the test method for resin-impregnated strand defined in JIS-R-7608 (2004). In the test, the resin formulation used is a 100/3/4 (parts by weight) blend of "CEL-LOXIDE®" 2021P (manufactured by DAICEL CHEMICAL INDUSTRIES, LTD.)/boron trifluoride monoethylamine (manufactured by Tokyo Chemical Industry Co., Ltd.)/acetone, and the curing condition used included normal pressure, 130° C., and 30 minutes. 10 strands of carbon fiber bundle were measured, and the average is used for the tensile strength and tensile modulus of the resin-impregnated strands. The strain range in the measurement of the tensile modulus of resin-impregnated strands is 0.45 to 0.85%.

The single-fiber modulus of the carbon fiber in the sizing agent-coated carbon fiber bundle is preferably at least 320 GPa, more preferably at least 340 GPa, and still more preferably at least 350 GPa. To evaluate the single-fiber strength by the fragmentation method, it is more important that the fiber breakage is reduced at a high fiber stress than that the fiber breakage is reduced at a high strain of the single-fiber composites and, therefore, the strain of the single-fiber composites is converted to the fiber stress. To convert the carbon fiber strain in the fragmentation method to the fiber stress, the tensile modulus of resin-impregnated strands or the single-fiber modulus of the carbon fiber is necessary, and the single-fiber modulus is used. When the single-fiber modulus is high, higher stress is applied to the fiber even when the strain of the composite material single-fiber composites is low. Because of the relation with the matrix resin properties, the OHT may become reduced when the single-fiber modulus is less than 320 GPa.

The single-fiber modulus of the carbon fiber may be determined according to JIS-R-7606 (2000). More specifically, the single-fiber modulus cannot be accurately measured in the single-fiber tensile test due to the slippage between the carbon fiber and the adhesive of the clumping region at the chuck. However, since the error can be reduced by increasing the gauge length, a gauge length of 50 mm is used. The strain range in the measurement of the single-fiber modulus is the entire range of 0% strain to the breakage.

The sizing agent-coated carbon fiber bundle is a carbon fiber bundle having a sizing agent at least containing an aliphatic epoxy compound (C) and an aromatic epoxy compound (D) coated thereon.

The carbon fiber coated with a sizing agent which solely contains the aromatic epoxy compound (D) as the epoxy compound and not containing the aliphatic epoxy compound (C) has the merit of low reactivity between the sizing agent and the matrix resin resulting in reduced change of the mechanical properties in the long term storage of the prepreg. Such carbon fiber also has the merit that a rigid interfacial layer can be formed. However, compared to the aliphatic epoxy compound (C), the aromatic epoxy compound (D) suffers from somewhat inferior adhesion between the carbon fiber and the matrix resin due to the rigidity of the compound.

The carbon fiber coated with a sizing agent which solely contains the aliphatic epoxy compound (C) as the epoxy compound is confirmed to be highly adhesive to the matrix resin. Although the mechanism is uncertain, we believe that in the aliphatic epoxy compound (C) having a soft skeleton and a structure with high degree of freedom, strong interaction occurs between the functional groups such as carboxyl group and hydroxy group on the surface of the carbon fiber and the aliphatic epoxy compound. However, while the aliphatic epoxy compound (C) develops high adhesion by the interaction with the carbon fiber surface, the aliphatic epoxy compound (C) is also highly reactive with compounds having a functional group such as curing agent in the matrix resin, and when stored for a long time in the state of prepreg, the structure of the interfacial layer changes by the interaction between the matrix resin and the sizing agent and the carbon fiber-reinforced composite material obtained from the prepreg suffers from the inferior mechanical properties.

When the aliphatic epoxy compound (C) and the aromatic epoxy compound (D) are mixed, there is a phenomenon that the aliphatic epoxy compound (C) having a higher polarity will be richer on the carbon fiber side and, on the contrary, the aromatic epoxy compound (D) having lower polarity will be rich in the outermost layer of the sizing layer on the side opposite to the side of the carbon fiber. As a result of this gradient structure of the sizing layer, the aliphatic epoxy compound (C) exhibits strong interaction with the carbon fiber near the carbon fiber, and adhesion between the carbon fiber and the matrix resin is thereby improved. The aromatic epoxy compound (D) rich in the outer layer plays the role of blocking the aliphatic epoxy compound (C) from the matrix resin when the prepreg is produced by using a sizing agent-coated carbon fiber bundle. This suppresses the reaction between the aliphatic epoxy compound (C) and the highly reactive component in the matrix resin, and stability in the long term storage is thereby realized.

The sizing agent contains the aliphatic epoxy compound (C) and the aromatic epoxy compound (D). Content of the aliphatic epoxy compound (C) is preferably 35 to 65% by weight in relation to the entire amount of the coated sizing agent. The content of at least 35% by weight contributes to the improvement of the adhesiveness while the content of up to 65% by weight results in the good mechanical properties of the resulting carbon fiber-reinforced composite material even when the prepreg produced by using the sizing agent-coated fiber is stored for a prolonged period. The content of the aliphatic epoxy compound (C) is preferably at least 38% by weight, and more preferably at least 40% by weight.

Also, the content of the aliphatic epoxy compound (C) is preferably up to 60% by weight, and more preferably at least 55% by weight.

The content of the aromatic epoxy compound (D) is preferably 35 to 60% by weight in relation to the entire amount of the sizing agent. When the content of the aromatic epoxy compound (D) is at least 35% by weight, the compositional ratio of the aromatic compound in the outer layer of the sizing agent can be maintained at a high level, and loss of mechanical properties by the reaction between the aliphatic epoxy compound with higher reactivity and the reactive compound in the matrix resin during the prolonged storage of the prepreg will be suppressed. The content of up to 60% by weight is preferable since the gradient structure in the sizing agent as described above will be realized and adhesiveness will be maintained. The content of the aromatic epoxy compound (D) is more preferably at least 37% by weight, and still more preferably at least 39% by weight. Also, the content of the aromatic epoxy compound (D) is more preferably up to 55% by weight, and still more preferably at least 45% by weight.

The mass ratio (C)/(D) of the aliphatic epoxy compound (C) and the aromatic epoxy compound (D) is preferably 52/48 to 80/20. When the (C)/(D) is at least 52/48, the proportion of the aliphatic epoxy compound (C) on the carbon fiber surface will be increased and adhesion between the carbon fiber and the matrix resin will be improved. As a consequence, the resulting carbon fiber-reinforced resin will have improved composite mechanical properties including the tensile strength. When the mass ratio is up to 80/20, amount of the highly reactive aliphatic epoxy compound on the carbon fiber surface will be reduced, and the reactivity with the matrix resin sill be suppressed. The mass ratio (C)/(D) is preferably at least 55/45 and more preferably at least 60/40, and also, preferably up to 75/35 and more preferably up to 73/37.

The surface of the sizing agent of sizing agent-coated carbon fiber bundle is measured by X-ray photoelectron spectroscopy at a photoelectron takeoff angle of 15° to obtain C1s inner shell spectrum, and ratio (a)/(b) of (a) height (cps) of the component at the binding energy (284.6 eV) corresponding to CHx, C—C, and C=C to (b) height (cps) of the component at the binding energy (286.1 eV) corresponding to C—O was 0.50 to 0.90. The ratio (a)/(b) is more preferably up to 0.55, and still more preferably up to 0.57. Also, the ratio (a)/(b) is preferably up to 0.80, and more preferably up to 0.74. The larger ratio (a)/(b) indicates that the compound derived from aromatic compound is abundant on the sizing agent surface, and the compound derived from aliphatic ester is less abundant on the sizing agent surface. The sizing agent-coated carbon fiber bundle with the ratio (a)/(b) within particular range is highly adhesive to the matrix resin, and the loss of mechanical properties in the long term storage of the prepreg prepared by using the sizing agent-coated carbon fiber bundle is reduced.

X-ray photoelectron spectroscopy is an analytical technique wherein the sample is irradiated with X-ray in an ultrahigh vacuum, and the kinetic energy of the photoelectron released from the sample surface is measured by an apparatus called an energy analyzer. By examining the kinetic energy of the photoelectron released from the sample surface, the binding energy can be uniquely determined by calculation from the energy value of the X-ray that has entered the sample. The type, concentration, as well as chemical state of the elements on the outermost surface (–nm) of the sample can be analyzed from the binding energy and intensity of the photoelectron.

The peak ratio (a)/(b) of the sizing agent surface of the sizing agent-coated fiber is determined by the X-ray photoelectron spectroscopy according to the procedure as described below. The sizing agent-coated carbon fiber bundle is cut to 20 mm and spread on a copper sample table. Then, by maintaining the sample chamber at $1\times10^{-8}$ Torr, the measurement is conducted by using $AlK\alpha_{1,2}$ for the X-ray source. The binding energy value of the main peak of C1s as the peak correction value with the electric charge in the measurement is set at 286.1 eV. The peak area C1s is determined by depicting a base line (a straight line) of 282 to 296 eV. By defining the base line (straight line) at 282 to 296 eV used in determining the area in the C1s peak as the origin point (zero point) of the photoelectron strength, b) height (cps, photoelectron intensity per unit time) of the component at the binding energy of 286.1 eV corresponding to C—O and (a) height (cps) of the component at the binding energy of 284.6 eV corresponding to CHx, C—C, and C=C are determined, and peak height ratio of (a)/(b) is calculated.

When the inner layer of the sizing agent of the sizing agent-coated fiber is measured by X-ray photoelectron spectroscopy at a photoelectron takeoff angle 15° to obtain C1s inner shell spectrum, ratio (a')/(b') of (a') height (cps) of the component at the binding energy (284.6 eV) corresponding to CHx, C—C, and C=C to (b') height (cps) of the component at the binding energy (286.1 eV) corresponding to C—O is preferably 0.45 to 1.0. To measure the inner layer of the sizing agent, the sizing agent-coated carbon fiber is ultrasonically washed with acetone solvent for 1 to 10 minutes and, then, with distilled water, and the residual sizing agent attached to the carbon fiber is controlled to 0.10±0.05% by weight. The measurement is thereafter conducted by the method as described above.

The coating weight of the sizing agent is preferably 0.1 to 3.0 parts by weight, and more preferably 0.2 to 3.0 parts by weight in relation to 100 parts by weight of the carbon fiber. The coating weight of the sizing agent in such range enables the realization of high OHT.

The coating weight of the sizing agent may be determined by collecting 2±0.5 g of the sizing agent-coated carbon fiber, subjecting the sizing agent-coated carbon fiber to a heat treatment at 450° C. in a nitrogen atmosphere for 15 minutes, and finding the mass change before and after the heat treatment by comparison with the mass of the sizing agent-coated carbon fiber before the heat treatment.

The coating weight of the aliphatic epoxy compound (C) is preferably 0.05 to 2.0 parts by weight, more preferably 0.2 to 2.0 parts by weight, and still more preferably 0.3 to 1.0 parts by weight in relation to 100 parts by weight of the carbon fiber. When the coating weight of the aliphatic epoxy compound (C) is 0.05 parts by weight or more, adhesiveness of the sizing agent-coated carbon fiber bundle with the matrix resin will be improved by the aliphatic epoxy compound (C) on the carbon fiber surface.

The aliphatic epoxy compound (C) is an epoxy compound which does not contain an aromatic ring. Due to the flexible skeleton with a high degree of freedom, this compound is capable of undergoing a strong interaction with the carbon fiber.

The aliphatic epoxy compound (C) is an epoxy compound having at least 1 epoxy group in the molecule, and this enables formation of the strong bond between the carbon fiber and the epoxy group in the sizing agent. However, the number of epoxy groups in the molecule is preferably at least 2, and more preferably at least 3. In an epoxy compound having 2 or more epoxy groups in the molecule, even if 1 epoxy group has formed a covalent bond with the oxygen-containing functional group on the surface of the carbon fiber, remaining epoxy groups can form a covalent or hydrogen bond with the matrix resin to further improve adhesiveness. Although there is no upper limit for the number of the epoxy groups, 10 epoxy groups is enough in view of the adhesiveness.

The aliphatic epoxy compound (C) is preferably an epoxy compound having 3 or more in total of 2 or more types of functional groups and, more preferably, an epoxy compound having 4 or more in total of 2 or more types of functional groups. The functional group of the epoxy compound other than the epoxy group is preferably one selected from hydroxy group, amide group, imide group, urethane group, urea group, sulfonyl group, and sulfo group. In an epoxy compound having 3 or more epoxy groups or other functional groups in the molecule, even if 1 epoxy group has been occupied in the covalent bond formed with the oxygen-containing functional group on the surface of the carbon fiber, remaining 2 or more epoxy groups or other functional groups can form a covalent or hydrogen bond with the matrix resin to further improve adhesiveness. Although there is no upper limit on the number of the functional groups including the epoxy group, 10 functional groups is enough in view of adhesiveness.

The epoxy equivalent of the aliphatic epoxy compound (C) is preferably less than 360 g/mol, more preferably less than 270 g/mol, and more preferably less than 180 g/mol. When the epoxy equivalent is less than 360 g/mol, interaction with the carbon fiber occurs at a high density, and the adhesion between the carbon fiber and the matrix resin will be further improved. Although there is no lower limit for the epoxy equivalent, the epoxy equivalent of at least 90 g/mol is enough in view of adhesiveness.

Examples of the aliphatic epoxy compound (C) include glycidyl ether epoxy compounds derived from a polyol, glycidylamine epoxy compounds derived from an amine having two or more active hydrogens, glycidyl ester epoxy compounds derived from a polycarboxylic acid, and epoxy compounds obtained by oxidating a compound having two or more double bonds in the molecule.

Exemplary glycidyl ether epoxy compounds include glycidyl ether epoxy compounds obtained by reacting epichlorohydrin with a polyol, and additional exemplary glycidyl ether epoxy compounds include epoxy compounds obtained by reacting ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexane dimethanol, hydrogenated bisphenol A, hydrogenated bisphenol F, glycerol, diglycerol, polyglycerol, trimethylolpropane, pentaerythritol, sorbitol, or arabitol with epichlorohydrin. Also included in such glycidyl ether epoxy compounds are glycidyl ether epoxy compounds having dicyclopentadiene skeleton.

Exemplary glycidylamine epoxy compounds include epoxy compounds obtained by reacting 1,3-bis(aminomethyl)cyclohexane with epichlorohydrin.

Exemplary glycidyl ester epoxy compounds include epoxy compounds obtained by reacting dimer acid with epichlorohydrin.

Exemplary epoxy compounds obtained by oxidating a compound having two or more double bonds in the molecule include epoxy compounds having epoxycyclohexane ring in the molecule, and examples of such epoxy compound include epoxidated soybean oil.

Examples of the aliphatic epoxy compound (C) other than such epoxy compounds include epoxy compounds such as triglycidyl isocyanurate.

Exemplary compounds having hydroxy group in addition to the epoxy group include sorbitol polyglycidyl ether and glycerol polyglycidyl ether, and examples include "Denacol®" EX-611, EX-612, EX-614, EX-614B, EX-622, EX-512, EX-521, EX-421, EX-313, EX-314, and EX-321 manufactured by Nagase ChemteX Corporation.

Exemplary compounds having amide group in addition to the epoxy group include amide-modified epoxy compounds. Such amide-modified epoxy compounds may be produced by reacting epoxy group of an epoxy compound having at least 2 epoxy groups with carboxyl group of an aliphatic dicarboxylic acid amide.

Exemplary compounds having urethane group in addition to the epoxy group include urethane-modified epoxy compounds. Examples of such compound include "Adeka Resin®" PU-78-13S, EPU-6, EPU-11, EPU-15, EPU-16A, EPU-16N, EPU-17T-6, EPU-1348, and EPU-1395 manufactured by ADEKA CORPORATION. Alternatively, the compound having urethane group may be obtained by reacting the terminal hydroxy group of polyethylene oxide monoalkyl ether with a polyhydric isocyanate at an amount equivalent with the amount of the hydroxy group, and then, reacting the isocyanate residue of the resulting reaction product with hydroxy group in the polyhydric epoxy compound. Examples of such polyhydric isocyanate include hexamethylene diisocyanate, isophorone diisocyanate, and norbornane diisocyanate.

Exemplary compounds having urea group in addition to the epoxy group include urea-modified epoxy compounds. The urea-modified epoxy compound may be obtained by reacting carboxyl group of the urea aliphatic dicarboxylate with the epoxy group of an epoxy compound having at least 2 epoxy groups.

Of the aliphatic epoxy compound (C) as described above, the preferred are ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexane dimethanol, glycerol, diglycerol, polyglycerol, trimethylolpropane, pentaerythritol, sorbitol, and a glycidyl ether epoxy compound obtained by the reaction between a polyol selected from arabitols and epichlorohydrin in view of the high adhesiveness. Polyglycerol polyglycidyl ether is more preferred.

The aromatic epoxy compound (D) is an epoxy compound having at least 1 aromatic ring in the molecule. The aromatic ring may be either an aromatic ring hydrocarbon solely comprising carbon atoms or a heterocyclic aromatic ring such as furan, thiophene, pyrrole, or imidazole containing a heteroatom such as nitrogen or oxygen. The aromatic ring may also be a polycyclic aromatic ring such as naphthalene or anthracene. In the fiber-reinforced composite material comprising the sizing agent-coated carbon fiber bundle and the matrix resin, the so-called interfacial layer in the vicinity of the carbon fiber may have properties different to those of the matrix resin by the influence of the carbon fiber or the sizing agent. When the epoxy compound has at least 1 aromatic ring, a rigid interfacial layer will be formed, and this results in the improved stress transfer between the carbon fiber and the matrix resin, which in turn results in improved mechanical properties such as 0° tensile strength of the fiber-reinforced composite material. The aromatic ring also contributes to improvement in hydrophobicity, and the interaction with the carbon fiber is reduced compared to aliphatic epoxy compounds and, as a consequence, the aromatic epoxy compound (D) will cover the aliphatic epoxy compound and exist in the outer layer of the sizing layer. This situation is preferable since deterioration in the prolonged storage will be suppressed when the sizing agent-coated carbon fiber bundle is used for the prepreg and stored for a long time. More preferably, the aromatic epoxy compound has 2 or more aromatic rings in view of improving long term stability. Although there is no upper limit for the number of the aromatic rings, 10 aromatic rings is enough in view of the mechanical properties and also in view of suppressing the reaction with the matrix resin.

The number of epoxy groups in the aromatic epoxy compound (D) is preferably at least 2 and more preferably at least 3, and also, preferably up to 10.

The aromatic epoxy compound (D) is preferably an epoxy compound having 3 or more in total of 2 or more types of functional groups in the molecule, and more preferably, an epoxy compound having 4 or more in total of 2 or more types of functional groups in the molecule. The functional group of the epoxy compound other than the epoxy group is preferably one selected from hydroxy group, amide group, imide group, urethane group, urea group, sulfonyl group, and sulfo group. In an epoxy compound having 3 or more epoxy groups or other functional groups in the molecule, even if 1 epoxy group is occupied in the covalent bond formed with the oxygen-containing functional group on the surface of the carbon fiber, the remaining 2 or more epoxy groups or other groups can form a covalent or hydrogen bond with the matrix resin to further improve adhesiveness. Although there is no upper limit for the number of the functional groups including the epoxy group, 10 functional groups is enough in view of adhesiveness.

The epoxy equivalent of the aromatic epoxy compound (D) is preferably less than 360 g/mol, more preferably less than 270 g/mol, and more preferably less than 180 g/mol. When the epoxy equivalent is less than 360 g/mol, a covalent bond is formed at a high density, and the adhesion between the carbon fiber and the matrix resin will be further improved. Although there is no lower limit for the epoxy equivalent, an epoxy equivalent of at least 90 g/mol is enough in view of adhesiveness.

Examples of the aromatic epoxy compound (D) include glycidyl ether epoxy compounds derived from a polyol, glycidylamine epoxy compounds derived from an amine having two or more active hydrogens, glycidyl ester epoxy compounds derived from a polycarboxylic acid, and epoxy compounds obtained by oxidating a compound having two or more double bonds in the molecule.

Exemplary glycidyl ether epoxy compounds include bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and the epoxy compounds obtained by the reaction of tetrakis(p-hydroxyphenyl)ethane and epichlorohydrin. Further examples of the glycidyl ether epoxy compound include epoxy compounds having biphenyl aralkyl skeleton.

Exemplary glycidylamine epoxy compounds include N,N-diglycidylaniline and N,N-diglycidyl-o-toluidine, and also, epoxy compounds obtained by the reaction between m-xylylenediamine, m-phenylenediamine, 4,4'-diaminodiphenylmethane, or 9,9-bis(4-aminophenyl)fluorene with epichlorohydrin. Further examples include epoxy compounds obtained by reacting both hydroxy group and amino group of an aminophenol such as m-aminophenol, p-aminophenol, or 4-amino-3-methylphenol with epichlorohydrin.

Exemplary glycidyl ester epoxy compounds include epoxy compounds obtained by reacting phthalic acid, terephthalic acid, or hexahydrophthalic acid with epichlorohydrin.

Other examples of the aromatic epoxy compound (D) include epoxy compounds synthesized by using the epoxy compounds as described above for the starting material, for example, epoxy compounds synthesized by oxazolidone ring formation reaction from bisphenol A diglycidyl ether and tolylene diisocyanate.

Exemplary compounds having amide group in addition to the epoxy group include glycidyl benzamide and amide-modified epoxy compound. The amide-modified epoxy compound may be obtained by reacting carboxyl group of a dicarboxylic acid amide having an aromatic ring with epoxy group of the epoxy compound having 2 or more epoxy groups.

Exemplary compounds having imide group in addition to the epoxy group include glycidyl phthalimide, and examples include "Denacol®" EX-731 manufactured by Nagase ChemteX Corporation.

Exemplary compounds having urethane group in addition to the epoxy group include an epoxy compound obtained by reacting terminal hydroxy group of a polyethylene oxide monoalkylether with a polyhydric isocyanate having an aromatic ring at a reactive equivalent amount of the hydroxyl group and, then, reacting the isocyanate residue of the resulting reaction product with the hydroxy group in the polyhydric epoxy compound. Examples of the polyhydric isocyanate used include 2,4-tolylene diisocyanate, m-phenylene diisocyanate, p-phenylene diisocyanate, diphenylmethanediisocyanate, triphenylmethane triisocyanate, and biphenyl-2,4,4'-triisocyanate.

Exemplary compounds having urea group in addition to the epoxy group include urea-modified epoxy compounds. The urea-modified epoxy compound may be obtained by reacting carboxyl group of a dicarboxylic acid urea with epoxy group of an epoxy compound having an aromatic ring having at least 2 epoxy groups.

Exemplary compounds having sulfonyl group in addition to the epoxy group include bisphenol S epoxy compounds.

Exemplary compounds having sulfo group in addition to the epoxy group include p-toluenesulfonic acid glycidyl and 3-nitrobenzene sulfonic acid glycidyl.

The aromatic epoxy compound (D) is preferably a phenol novolac epoxy compound, cresol novolac epoxy compound, tetraglycidyl diaminodiphenylmethane, bisphenol A epoxy compound, or bisphenol F epoxy compound in view of stability and adhesiveness in the long term storage of the prepreg. The aromatic epoxy compound (D) is more preferably a bisphenol A epoxy compound or bisphenol F epoxy compound.

The sizing agent may also contain at least 1 type of component other than the aliphatic epoxy compound (C) and the aromatic epoxy compound (D). An accelerator agent to improve adhesion of the carbon fiber with the sizing agent imparts a bundling property or softness to the sizing agent-coated carbon fiber bundle, and the handling convenience, abrasion resistance and fluffing resistance are improved, and impregnation of the matrix resin is also improved. In addition, auxiliary components such as dispersant and surfactant may also be added for stabilization of the sizing agent.

The epoxy equivalent of the sizing agent coated on the carbon fiber is preferably 350 to 550 g/mol. The epoxy equivalent of up to 550 g/mol is preferable to improve adhesion of the carbon fiber coated with the sizing agent and the matrix resin. An epoxy equivalent of at least 350 g/mol is favorable since the reaction between the resin component used in the prepreg and the sizing agent can be suppressed when the sizing agent-coated carbon fiber bundle is used for the prepreg and the reaction of the resin component used in the prepreg is suppressed even when the prepreg is stored for a long time. The epoxy equivalent of the sizing agent coated on the carbon fiber may be determined by immersing the sizing agent-coated fiber in a solvent as typically represented by N,N-dimethylformamide, eluting the sizing agent by ultrasonic washing, opening the epoxy group with hydrochloric acid, and conducting an acid-base titration. More preferably, the epoxy equivalent is at least 360 g/mol, and still more preferably at least 380 g/mol. Also, the epoxy equivalent is preferably up to 530 g/mol, and more preferably up to 500 g/mol. The epoxy equivalent of the sizing agent coated on the carbon fiber may be controlled by the epoxy equivalent of the sizing agent used for the coating as well as thermal hysteresis in the drying after the coating.

The aliphatic epoxy compound (C) eluted from the sizing agent-coated fiber is preferably up to 0.3 part by weight in relation to 100 parts by weight of the sizing agent-coated carbon fiber bundle. Limitation of the elution amount to the range up to 0.3 part by weight is favorable since the carbon fiber-reinforced composite material can retain its good mechanical properties when it is used for production of a prepreg by using the sizing agent-coated carbon fiber bundle with a thermosetting resin by suppression of the reaction of the resin component of the thermosetting resin with the sizing agent. The amount eluted is preferably up to 0.1 part by weight, and more preferably up to 0.05 part by weight. The amount of the aliphatic epoxy compound (C) eluted from the sizing agent-coated fiber is determined by the procedure as described below.

0.1 g of the sizing agent-coated carbon fiber bundle is immersed in 10 ml of the solution prepared by mixing acetonitrile and chloroform at a volume ratio of 9 to 1, and the sizing agent is dissolved from the fiber by conducting ultrasonic cleaning for 20 minutes. 5 ml of the sample solution is collected and, after distilling off the solvent in nitrogen, a mixed solution of acetonitrile and chloroform was added to a volume of 0.2 ml to prepare a 25-fold concentrate. By conducting liquid chromatography using a mixed solution of this solution, water, and acetonitrile for the mobile phase, the peak of the aliphatic epoxy compound (C) was separated from peaks of other components and detected by evaporative light scattering detector (ELSD). The concentration of the aliphatic epoxy compound (C) was determined by using a calibration curve prepared by using the peak area of the solution of the aliphatic epoxy compound (C) at a known concentration for the standard to thereby calculate the eluted amount of the aliphatic epoxy compound (C) in relation to 100 parts by weight of the sizing agent-coated carbon fiber bundle.

The preferable carbon fiber is one having a surface oxygen concentration (O/C) which is the ratio in atom number of the oxygen (O) to the carbon (C) on the fiber surface measured by using X-ray photoelectron spectroscopy of 0.05 to 0.50, more preferably 0.06 to 0.30, and still more preferably 0.07 to 0.25. When the surface oxygen concentration (O/C) is at least 0.05, oxygen-containing functional groups on the carbon fiber surface is secured to enable firm adhesion with the matrix resin. Meanwhile, when the surface oxygen concentration (O/C) is up to 0.50, loss of the single-fiber strength of the carbon fiber itself by the oxidation is suppressed and, in other words, the number of fiber breaks when the apparent single-fiber stress of the single-fiber composite measured by the fragmentation method is 12.2 GPa can be controlled up to 1.7/mm. The surface oxygen concentration of the carbon fiber can be adjusted by the oxidation treatment as described below.

The surface oxygen concentration of the carbon fiber is determined by X-ray photoelectron spectroscopy by the following procedure. First, the carbon fiber having dirt and the like deposited on the surface removed by using a solvent is cut to about 20 mm, and spread on a copper sample table. By maintaining the sample chamber at $1 \times 10^{-8}$ Torr, the measurement is conducted by using $AlK\alpha_{1,2}$ for the X-ray source. The binding energy value of the main peak (peak top) of C1s as the peak correction value with the electric charge in the measurement is set at 284.6 eV. The peak area C1s is determined by depicting a base line (a straight line) of 282 to 296 eV, and the peak area O1s is determined by depicting a base line (a straight line) of 528 to 540 eV. The surface oxygen concentration O/C is a value calculated as an atom number ratio by dividing the ratio of the peak area O1s by a sensitivity correction value specific to the apparatus. The X-ray photoelectron spectroscopy apparatus used was ESCA-1600 manufactured by ULVAC-PHI, Inc., and the sensitivity correction value specific to the apparatus was 2.33.

The carbon fiber bundle is a fiber bundle prepared by bundling carbon fiber single-fibers. The number of the single-fiber is preferably 3000 to 48000, and more preferably 10000 to 20000.

Total fineness of the sizing agent-coated carbon fiber bundle is preferably 400 to 3000 tex, and the filament number of the carbon fiber is preferably 10000 to 30000.

The single-fiber diameter of the carbon fiber constituting the sizing agent-coated carbon fiber bundle is preferably up to 4.5 μm and more preferably up to 3.0 μm. When the single-fiber diameter is up to 4.5 μm, the probability of the surface flaw can be reduced and, accordingly, the single-fiber will have higher strength. In addition, the increased surface area ratio of the carbon fiber contributes to the adhesion with the matrix resin, and stress transfer in the carbon fiber-reinforced composite material will be even and, as a consequence, the OHT will be improved. However, impregnation of the matrix resin between the single-fibers is facilitated with the increase in the single-fiber diameter of the carbon fiber, and this results in the improvement of the OHT and, therefore, the single-fiber diameter is preferably at least 2.0 μm. The means used to realize such single-fiber diameter is not particularly limited as long as such range of the value is realized, and an exemplary means is adjustment of the fineness of the polyacrylonitrile precursor fiber as described below.

The sizing agent-coated carbon fiber bundle preferably has an average tearable length of 300 to 710 mm. The average tearable length is an index showing the degree of interlacing of carbon fibers in the carbon fiber bundle.

The method used in measuring the tearable length is shown in FIG. 1. The fiber bundle 1 is cut at a length of 1160 mm, and one end 2 is fixedly secured on a horizontal table with an adhesive tape so that the this end is not movable (This point is designated fixed point A). The other non-fixed end 3 of the fiber bundle is divided into two bundles by finger, and one bundle is secured to the table with an adhesive tape in a tightly stretched state so that the the end is not movable (This point is designated fixed point B). The other end of the divided bundle is pivoted on the table with no slack around the fixed point A, and that end is stopped at position 4 where the distance in a straight line from the fixed point B is 500 mm and fixedly secured on the table with an adhesive tape so that the end is not movable (This point is designated fixed point C). The area surrounded by the fixed points A, B, and C is visually observed, and after finding interlacing point 5 farthest from the fixed point A, length projected onto the straight line between the fixed point A and the fixed point B is read by using a ruler with a minimum scale of 1 mm. This length is designated the tearable length 6. This measurement is repeated 30 times, and the arithmetic mean value of the measurement is used as the average tearable length. In this measurement method, the interlacing point farthest from the fixed point A is the point which is farthest from the fixed point A in straight line distance where 3 or more single-fibers with no slacking are interlaced with each other.

The average tearable length will be shorter when the carbon fiber bundle is evenly interlaced to a stronger degree, while the average tearable length will be longer when the carbon fiber bundle is not interlaced or unevenly interlaced. When the carbon fiber bundle is evenly and strongly interlaced, the carbon fiber bundle will have a high bundle strength of carbon fiber with a long gauge length on the order of several meters and the OHT will be improved. Accordingly, a shorter average tearable length is preferable. More specifically, when the average tearable length of the sizing agent-coated carbon fiber bundle is up to 710 mm, a high tension can be applied to improve the fiber alignment in the processing of the prepreg into the carbon fiber-reinforced composite material. In addition, the OHT of the carbon fiber-reinforced composite material will be improved due to the improved evenness of the stress transfer in the carbon fiber-reinforced composite material. However, when the average tearable length of the sizing agent-coated carbon fiber bundle is less than 300 mm, alignment of the fiber will be insufficient and the sufficient OHT may not be realized since sufficient stress may not be concentrated on the fiber laminated at the direction of 0°. More preferably, the average tearable length is 300 to 600 mm. The average tearable length of the sizing agent-coated carbon fiber bundle can be controlled by controlling the average tearable length at the timing of the pre-carbonized fiber bundle as described below.

The bundle strength of the sizing agent-coated carbon fiber bundle may be calculated from the average strength of the single-fiber and Weibull shape parameter which generally represents the strength distribution, and the bundle strength is higher at a larger Weibull shape parameter. The Weibull shape parameter of a carbon fiber is approximately 3 to 8. However, the bundle strength can be greatly increased when the filaments are strongly interlaced even if the strength distribution of the single-fiber of the carbon fiber is the same. By reducing the average tearable length of the sizing agent-coated carbon fiber bundle, a bundle strength corresponding to the Weibull shape parameter of 20 or higher can be realized without changing the single-fiber strength distribution.

In addition to the average tearable length of the range as described above, the sizing agent-coated carbon fiber bundle may preferably have a proportion of the tearable length measurements of 800 mm or more of up to 15% since the merits as described above can be extended by reducing this proportion. The proportion of the tearable length measurements of 800 mm or more is the proportion of the tearable length measurements of 800 mm or more in 30 measurements when the tearable length is measured 30 times by the procedure as described above.

Proportion(%) of the tearable length measurements of 800 mm or more=(measurements of the tearable length of 800 mm or more/30)×100

When the proportion of the tearable length measurements of 800 mm or more is 15% or more, interlacing of the carbon fiber bundle is not controlled, and the parts where the stress is not properly transmitted between the single-fibers will be present in the carbon fiber bundle, and the quality may be reduced when a high elongation tension is applied in the carbonization process.

The sizing agent-coated carbon fiber bundle preferably has a bundle strength of the carbon fiber bundle at gauge length of 10 m of 1.9 to 4.0 GPa, more preferably 2.2 to 4.0 GPa, and more preferably 2.6 to 4.0 GPa. When the bundle strength of the carbon fiber bundle at gauge length of 10 m is at least 1.9 GPa, a high tension can be applied to improve fiber alignment in the processing of the carbon fiber-reinforced composite material and the OHT will be improved due to good stress transfer between the single-fibers. However, 4.0 GPa is the industrial upper limit of the bundle strength of the carbon fiber bundle at gauge length of 10 m. The bundle strength of the carbon fiber bundle can be improved by highly controlling the length dependency coefficient of the carbon fiber bundle.

We also provide a sizing agent-coated carbon fiber bundle having a sizing agent coated on the carbon fiber bundle having an average tearable length of 300 to 710 mm, a tensile strength of resin-impregnated strands of at least 5900 MPa, a tensile modulus of resin-impregnated strands of at least 320 GPa, and a number of broken single-filaments of 0.5 to 3/m, and which is substantially non-twisted. The expression "substantially non-twisted" means that the twist is 1 turn or less per meter of the fiber bundle even if twists are present.

The number of broken single-filaments is the number of broken single-filaments per meter of the carbon fiber bundle (broken filaments/m). A smaller number of broken single-filaments in the sizing agent-coated carbon fiber bundle is preferable, and the number of broken single-filaments is preferably 0.5 to 2/m. When the number of broken single-filaments is within such a range, stress will be evenly applied to the single-fibers in the composite, and this results in an improved open hole tensile strength as well as process passability in the subsequent processing. When the production process as described below is used, fiber breakage is reduced since each single-fiber evenly receives the stress due to the interlacing despite the high tension set in the pre-carbonization process.

Next, the production method of the carbon fiber bundle is described. First, a precursor fiber comprising polyacrylonitrile polymer is prepared, and this precursor fiber is subjected to an oxidation process, a pre-carbonization process, and a carbonization process to obtain the carbon fiber bundle.

The polyacrylonitrile polymer preferable for use in the precursor fiber to produce the sizing agent-coating carbon fiber has a weight average molecular weight of 500,000 to 1,110,000, and more preferably 700,000 to 900,000. When a polyacrylonitrile polymer having a weight average molecular weight of less than 500,000 which is the weight average molecular weight common for the polyacrylonitrile polymer used in the carbon fiber, the resulting carbon fiber is likely to suffer from the loss of the single fiber strength in the high strength range by the effect of the molecular chain terminals since linkage between the molecules in the fiber axial direction is reduced. While a higher weight average molecular weight of the polyacrylonitrile polymer is preferable, the polyacrylonitrile polymer having a high molecular weight in excess of 1,110,000 needs to be used at a low polymer concentration in the spinning of the polymer solution and, as a consequence, voids are formed in the resulting carbon fiber, and the carbon fiber is likely to experience loss of the carbon fiber single-fiber strength in the high strength region. The weight average molecular weight of the polyacrylonitrile polymer can be controlled by changing the amount of the monomer, initiator, chain transfer agent, and the like in the polymerization and, more specifically, the weight average molecular weight may be increased by increasing the monomer concentration, reducing the initiator concentration, or reducing the concentration of the chain transfer agent at the start of the polymerization. The weight average molecular weight and the intrinsic viscosity of the polyacrylonitrile polymer is in a 1:1 relationship, and the intrinsic viscosity of 4.0 is convertible to the weight average molecular weight of 1,110,000. The polyacrylonitrile polymer is the one containing at least the acrylonitrile unit as its main constitutional unit of the polymer. The "main constitutional unit" as used herein means that the particular unit constitutes 90 to 100 mol % of the polymer.

The preferable polyacrylonitrile polymer has a polydiversity Mz/Mw of 1.4 to 2.4. A higher Mz/Mw means that the components having different molecular weight are present on the high molecular weight region. Both the Mz/Mw of less than 1.4 and the Mz/Mw in excess of 2.4 result in the higher likeliness of the loss of the carbon fiber single-fiber strength in the high strength range.

The polyacrylonitrile polymer preferably contains a copolymerization component in view of improving the spinnability and, also, in view of improving efficiency of the oxidation treatment. Insufficient content of the copolymerization component may generally result in an inconsistent oxidation reaction, while excessive content of the copolymerization component may result in thermal degradation of the copolymerization component itself which is recognized as a flaw in the carbon fiber. The preferable content of the copolymerization component is 0.1 to 0.8% by weight, and the preferable copolymerization component is the one having at least 1 carboxyl group or amide group in view of the points as described above. To prevent loss of heat resistance, use of a small amount of the monomer capable of highly promoting the oxidation is preferable, and use of a copolymerization component having a carboxyl group rather than an amide group is also preferable. The number of the amide group and the carboxyl group is preferably 2 or more rather than 1. Preferred are acrylic acid, methacrylic acid, itaconic acid, crotonic acid, citraconic acid, ethacrylic acid, maleic acid, and mesaconic acid, more preferred are itaconic acid, maleic acid, and mesaconic acid, and most preferred is itaconic acid.

The polymerization method used in production of the polyacrylonitrile polymer may be known in the art.

The production method of the polyacrylonitrile precursor fiber comprises a spinning process wherein the spinning solution is extruded from the spinneret into a coagulation bath by dry-wet spinning; a water washing process wherein the fiber obtained in the spinning process is washed in a water bath; a water bath drawing process wherein the fiber obtained in the water washing process is drawn in a water bath, and a dry heat treatment process wherein the fiber obtained in the water bath drawing process is subjected to a dry heat treatment. If necessary, the method may also comprise a steam drawing process wherein the fiber obtained in the dry heat treatment process is drawn in steam.

The spinning solution may be a solution of the polyacrylonitrile polymer as described above in a solvent such as dimethyl sulfoxide, dimethylformamide, or dimethyl acetamide which can dissolve the polyacrylonitrile polymer. The spinning solution is preferably prepared so that the polyacrylonitrile polymer concentration is 10 to 18% by weight. The concentration of the spinning solution of less than 10% by weight may invite void formation in the carbon fiber which is likely to result in the loss of the single-fiber strength of the carbon fiber in the high strength range. The concentration of the spinning solution in excess of 18% by weight may require a decrease in the weight average molecular weight of the polymer in view of the spinnability.

The coagulation bath may preferably contain a solvent such as dimethyl sulfoxide, dimethylformamide, or dimethyl acetamide which is used as the solvent of the spinning solution and the so called coagulation aid component. The coagulation aid component may be one which does not dissolve the polyacrylonitrile polymer and is compatible with the solvent used in the spinning solution. A preferable example of the coagulation aid component is water.

In the water washing process, washing by water is preferably conducted by using serial stages of water washing baths at a temperature of 20 to 90° C. The draw ratio of the water bath drawing process is preferably, 1.3 to 5 folds, and more preferably 2 to 4 folds. After the water bath drawing process, the yarn is preferably provided with an oiling agent comprising a silicone or the like to prevent adhesion between the single-fibers. The silicone oiling agent used is preferably the one comprising a modified-silicone, and the preferred is the amino-modified silicone having a high heat resistance.

In the optional steam drawing process, the drawing is preferably of at least 3 folds, more preferably at least 4 folds, and still more preferably at least 5 folds is conducted in the steam at an elevated pressure.

The polyacrylonitrile precursor fiber is preferably prepared to have a fineness of up to 0.60 dtex, more preferably up to 0.41 dtex, and still more preferably up to 0.26 dtex. Such fineness can be realized by controlling the extruding rate of the spinning solution and the spinning speed.

Next, the thus obtained polyacrylonitrile precursor fiber is subjected to an oxidation process to thereby obtain the oxidated fiber. The oxidation process is preferably conducted at the highest possible temperature as long as the reaction does not become uncontrollable and, more specifically, this process is preferably conducted in air at 200 to 300° C. The oxidation treatment period in this oxidation process may be adequately selected from 10 to 100 minutes. Preferably, the oxidation treatment period is set so that the specific gravity of the resulting oxidated fiber is 1.3 to 1.4 to improve the mechanical properties of the resulting carbon fiber.

The oxidated fiber obtained in the oxidation process is subjected to the pre-carbonization process to obtain the pre-carbonization fiber. In the pre-carbonization process, the oxidated fiber is preferably heat treated in an inert atmosphere at a maximum temperature of 500 to 1200° C. until the specific gravity is 1.5 to 1.8.

The pre-carbonized fiber obtained in the pre-carbonization process is subjected to a carbonization process to obtain the carbon fiber. In the carbonization process, the pre-carbonized fiber is heated in an inert atmosphere to a temperature of 1200 to 2000° C. While use of a higher temperature in the carbonization process is preferable in view of increasing the tensile modulus of resin-impregnated strands of the resulting carbon fiber, excessively high temperature may invite loss of strength in the high strength range. Accordingly, the temperature is preferably set by taking both into consideration. A more preferable temperature range is 1200 to 1800° C., and a still more preferable temperature range is 1200 to 1600° C.

We further provide a method of producing a carbon fiber bundle wherein the carbonization process is conducted so that the tension in the carbonization process satisfies relation (1):

$$4.9 \leq \text{tension in the carbonization process(mN/dtex)} \leq -0.0225 \times (\text{average tearable length of the pre-carbonized fiber bundle(mm)}) + 23.5 \quad (1),$$

and the pre-carbonized fiber bundle is substantially non-twisted, and the pre-carbonized fiber bundle has an average tearable length of 150 to 620 mm. The expression "substantially non-twisted" means that the twist is 1 turn or less per meter of the fiber bundle even if twists are present.

In the carbonization process, the process is preferably conducted so that the tension in the carbonization process satisfies relation (2):

$$9.8 \leq \text{tension in the carbonization process(mN/dtex)} \leq -0.0225 \times (\text{average tearable length of the pre-carbonized fiber bundle(mm)}) + 23.5 \quad (2),$$

the pre-carbonized fiber bundle is substantially non-twisted, and the average tearable length of the pre-carbonized fiber bundle is 150 to 620 mm.

It is known that the tensile modulus of resin-impregnated strands of the carbon fiber bundle can be increased by increasing the maximum temperature in the carbonization process since crystallite size in the carbon fiber increases with an increase in the maximum temperature in the carbonization process. However, an increase in the maximum temperature in the carbonization process is also known to result in the loss of the tensile strength and adhesion strength of the carbon fiber bundle. Interlacing the pre-carbonized fiber bundle is regulated and, therefore, the tensile modulus of resin-impregnated strands of the resulting carbon fiber bundle can be increased by increasing the tension in the carbonization process without increasing the maximum temperature in the carbonization process. The crystallite size in the carbon fiber is preferably at least 1.2 nm and up to 2.5 nm, and more preferably at least 1.2 nm and up to 2.5 nm. The crystallite size of less than 1.2 nm may invite a decrease in the tensile modulus of resin-impregnated strands while the crystallite size in excess of 2.5 nm may result in a decrease of the tensile strength of resin-impregnated strands. A decrease in the tensile strength or the tensile modulus of the resin-impregnated strands may induce a decrease in the OHT, and the crystallite size is preferably controlled to the range as described above. The crystallite size can be controlled mainly by the temperature used in the carbonization treatment. Furthermore, the relation between the crystallite size and the tensile modulus of resin-impregnated strands preferably satisfies relation (3).

$$50 \times \text{crystallite size(nm)} + 200 \leq \text{tensile modulus of resin-impregnated strands} \leq 50 \times \text{crystallite size (nm)} + 300 \quad (3).$$

When relation (3) is satisfied, a good balance between the tensile modulus of resin-impregnated strands of the carbon fiber bundle and the single-fiber strength may be realized. Relation (3) can be satisfied by controlling the tearable length of the pre-carbonized fiber bundle to our range to thereby control the carbonization tension.

Tension in the carbonization process (carbonization tension) is the value obtained by dividing the tension (mN) measured on the outlet side of the carbonization furnace with the fineness (dtex) of the polyacrylonitrile precursor fiber in absolute dryness. When the tension is lower than 4.9 mN/dtex, orientation of the crystallites in the carbon fiber cannot be increased and the high tensile modulus of resin-impregnated strands will not be realized. This may result in reduced OHT. Setting the tension at the level in excess of 9.8 mN/dtex is preferable in view of the improved fiber alignment and facilitating the stress transfer between the single-fibers, and OHT can be improved without depending on the single-fiber strength at short gauge length. Tension preferably satisfies relation (2) since excessively high tension results in the loss of process passability and quality although higher tension is preferable in view of improving the tensile modulus of resin-impregnated strands of the resulting carbon fiber. The meaning of the primary coefficient −0.0225 on the right side of relation (2) is the tension reduction gradient that can be set with the increase in the average tearable length, and the constant term 23.5 is the tension which can be set when the average tearable length is reduced to the least possible level.

The tearable length of the pre-carbonized fiber bundle in the carbonization process is an index of interlacing of the fiber bundle. The tearable length of the pre-carbonized fiber bundle is determined by the same procedure as the tearable length of the carbonization fiber bundle as described above.

The hook drop method is a conventional method commonly used to evaluate the interlacing condition. The degree of interlace (CF value) of the fiber bundle by hook drop method is measured according to JIS L1013 (2010). First, the fiber bundle measured is fixed to the upper part of the hanger device, and a weight (spindle) is secured to the lower end of the fiber bundle to vertically hang the sample. A hook with a smooth surface having a diameter of 0.6 mm and a weight of 10 g is inserted in the fiber bundle at a position 1 cm downward from the fixed upper end of the sample so that the hook divides the bundle into two bundles, and the distance of the hook downward movement is measured.

The index we use for the degree of interlacing is not the degree of interlacing (CF value) determined by conventional hook drop method but the average tearable length. We found that, by limiting this average tearable length to a particular range, high drawing tension in the carbonization process can be realized while avoiding the decrease in the strength at the high strength range of the carbon fiber. To apply a high drawing tension in the carbonization process, the fiber bundle should be in the state allowing high stress transfer between single-fibers and, therefore, a dense interlacing network of single-fibers should be formed. While the conventional hook drop method conducts an evaluation at the level of "point" by using the hook, an evaluation of tearable length is at the level of the "plane" of the whole bundle. This difference enables adequate definition of the state that enables the realization of the high drawing tension in the carbonization process.

When the tearable length of pre-carbonized fiber bundle in the carbonization process is short, the degree of interlacing is high and, since stress transfer between the single-fibers is increased, the draw tension in the carbonization process can be increased. However, when the tearable length is less than 150 mm, misalignment of the carbon fiber bundle increases and the carbon fiber bundle is not sufficiently aligned and, as a consequence, the open hole tensile strength is decreased. When the tearable length is in excess of 620 mm, the weak interlacing invites breakage of the single-fibers at a certain probability in the carbonization process which results in the increase of the stress applied to other unbroken single-fibers in the carbonization process. This induces variation in the structure and, hence, variation in the strength between the single-fibers, and the single-fiber strength distribution of the carbon fiber in the short gauge length range becomes uncontrollable to result in the loss of the OHT. The tearable length of the pre-carbonized fiber bundle is more preferably 150 to 500 mm.

The tearable length preferably has a smaller variation. The proportion of the tearable length of at least 800 mm is preferably up to 15% and, more preferably, this proportion is up to 10%. The "proportion of the tearable length of at least 800 mm" as used herein is the proportion of measurement where the tearable length was at least 800 mm in 30 measurements when the measurement of the tearable length was conducted 30 times. When the proportion of the tearable length of at least 800 mm is at least 15%, the interlacing state is not controlled, and the bundle includes some parts where the stress transfer between single-fibers is low, and this condition may invite loss of quality when a high draw tension is applied in the carbonization process. This condition may also induce an increase in the variation in the structure between the single-fibers and the associated variation in the strength between the single-fibers, and the single-fiber strength distribution of the carbon fiber in the short gauge length range becomes uncontrollable, and as a consequence, the OHT is reduced. The proportion of the tearable length of at least 800 mm is determined by conducting the measurement of the tearable length as described above for 30 times, and conducting the calculation by relation (4):

Proportion of the tearable length of at least 800 mm(%)=frequency of the tearable length of at least 800 mm/30×100     (4).

The average tearable length of the pre-carbonized fiber bundle as described above can be achieved by any method as long as the value range as described above is achieved although the preferable method is the interlacing of the fiber bundle by using a fluid. More specifically, preferred is a fluid interlacing treatment in any of the process of producing the polyacrylonitrile precursor fiber bundle, the oxidation process, and the pre-carbonization process in the state when the coefficient of kinetic friction between the fiber bundles is 0.3 to 0.6. A higher coefficient of kinetic friction is preferable to reduce the tearable length, and the coefficient of kinetic friction is more preferably 0.4 to 0.6, and still more preferably 0.5 to 0.6. The coefficient of kinetic friction can be measured by the method as described below, and it can be controlled by the surface morphology and cross sectional shape of the filament constituting the fiber bundle and type of the oiling agent applied to the fiber bundle.

The process of conducting the fluid interlacing treatment may be any of processes of producing the polyacrylonitrile precursor fiber bundle, the oxidation process, and the pre-carbonization process as long as the coefficient of kinetic friction is 0.3 to 0.6. However, the fluid interlacing treatment is preferably conducted in the process of producing the polyacrylonitrile precursor fiber bundle when elongation of the fiber is relatively easy and, more preferably, before applying the oiling agent to the polyacrylonitrile precursor fiber bundle. When the fluid interlacing treatment is conducted at some timing in the process of producing the polyacrylonitrile precursor fiber bundle, the average tearable length of the polyacrylonitrile precursor fiber bundle after the fluid interlacing treatment is preferably 100 to 500 mm, more preferably 100 to 400 mm, and still more preferably 100 to 300 mm. When the average tearable length is less than 100 mm, single-fiber density in the bundle is increased and oxidation does not proceed to the interior of the bundle in the oxidation process and the resulting oxidation inconsistency induces variation in the structure and the variation in the strength between the single-fibers which may result in the loss of the open hole tensile strength. The average tearable length in excess of 500 mm may invite loss of quality or fiber breakage when a high draw tension is applied in the carbonization process.

The fluid used in the fluid interlacing treatment may be either a gas or a liquid, and preferred is air or nitrogen in view of low cost. In the fluid interlacing treatment, the fluid is preferably sprayed onto the fiber bundle by using a nozzle, and the shape of the nozzle used in spraying the fluid is not particularly limited while the one having 2 to 8 orifices is preferable. While the arrangement of the orifices are not particularly limited, two or more orifices are preferably arranged around the fiber bundle so that the longitudinal direction of the fiber bundle and the spray direction of the fluid are at an angle of 88° to 90° and each ejection orifice faces another ejection orifice at opposite sides of the fiber bundle forming an ejection orifice pair. Other conditions such as tension of the fiber bundle and the fluid ejection pressure in the fluid interlacing treatment may be adequately adjusted so that the tearable length is appropriate.

The fluid interlacing treatment is preferably conducted in the state so that tension is preferably at 2 to 5 mN/dtex-fiber bundle and fluid ejection pressure is 0.2 to 0.4 MPa-G. More preferably, tension is 2 to 3 mN/dtex-fiber bundle, and ejection pressure is 0.25 to 0.35 MPa-G. Preferably, the fiber bundle during the fluid interlacing treatment is substantially non-twisted. The expression "substantially non-twisted" means that the twist is 1 turn or less per meter of the fiber bundle even if twists are present.

When the tension during the fluid interlacing treatment is higher than 5 mN/dtex-fiber bundle, rotational movement of the single-fiber is suppressed, and formation of the interlacing may be suppressed. Meanwhile, when the tension during the fluid interlacing treatment is less than 2 mN/dtex-fiber bundle, rotational movement of the single-fiber constituting the fiber bundle will be facilitated and interlacing will be easier while the fiber bundle may come into contact with the nozzle and the resulting yarn defects and flow may invite loss of quality and decrease in the tensile strength of resin-impregnated strands. Excessive rotational movement of the fiber bundle may also result in an inconsistent formation of the interlacing in the longitudinal direction of the fiber bundle and some parts in the fiber bundle may have a lower degree of interlacing. When the pressure during the fluid interlacing treatment is higher than 0.4 MPa-G, the fluid may cause yarn defects and flows, which may also cause loss of quality and decrease in the tensile strength of resin-impregnated strands. When the pressure during the fluid interlacing treatment is lower than 0.2 MPa-G, rotational movement of the single-fiber may be suppressed and, as a consequence, formation of the interlacing may be suppressed. The fiber bundle tension and fluid ejection pressure in the fluid interlacing treatment are preferably determined in view of the balance between the situations as described above.

The number of single-fibers constituting the fiber bundle in the fluid interlacing treatment is preferably up to 12000, and more preferably up to 6000. While interlacing of the single-fibers becomes easy with the increase in the number of single-fibers constituting the fiber bundle, non-interlaced parts will also be formed in the fiber bundle and the interlacing will be uneven. When the polyacrylonitrile precursor fiber bundle is subjected to a fluid interlacing treatment, 2 or more yarns after the fluid interlacing treatment may be brought together for inclusion of filaments necessary as the final product.

The resulting carbon fiber bundle is subjected to oxidation treatment to improve adhesiveness with the matrix resin to thereby introduce an oxygen-containing functional group. Exemplary such treatments include vapor phase oxidation, liquid phase oxidation, and liquid phase electrolytic oxidation. In view of high productivity and capability of conducting uniform treatment, liquid phase electrolytic oxidation is preferred.

The electrolytes which may be used in the liquid phase electrolytic oxidation include acidic electrolyte and alkaline electrolyte. In view of adhesiveness, the carbon fiber bundle is preferably subjected to liquid phase electrolytic oxidation in an alkaline electrolyte and the sizing agent is thereafter coated.

Exemplary acidic electrolytes include inorganic acids such as sulfuric acid, nitric acid, hydrochloric acid, phosphoric acid, boric acid, and carbonic acid, organic acids such as acetic acid, butyric acid, oxalic acid, acrylic acid, and maleic acid, and salts such as ammonium sulfate and ammonium hydrogen sulfate. Of these, preferred are sulfuric acid and nitric acid, which are strongly acidic.

Exemplary alkaline electrolytes include aqueous solution of a hydroxide such as sodium hydroxide, potassium hydroxide, magnesium hydroxide, calcium hydroxide, or barium hydroxide, aqueous solution of a carbonate such as sodium carbonate, potassium carbonate, magnesium carbonate, calcium carbonate, barium carbonate, or ammonium carbonate, aqueous solution of a hydrogen carbonate such as sodium hydrogencarbonate, potassium hydrogencarbonate, magnesium hydrogencarbonate, calcium hydrogencarbonate, barium hydrogencarbonate, or ammonium hydrogencarbonate, and aqueous solution of ammonia, tetraalkylammonium hydroxide, or hydrazine. Of these, preferred are aqueous solution of ammonium carbonate or ammonium hydrogen carbonate and aqueous solution of tetraalkylammonium hydroxide which is a strong alkali since they do not contain an alkaline metal which inhibits curing of the matrix resin.

The concentration of the electrolyte is preferably 0.01 to 5 mole/l, and more preferably 0.1 to 1 mole/l. When the concentration of the electrolyte is at least 0.01 mole/l, the voltage in the electrolysis, and hence, operational cost can be advantageously reduced. An electrolyte concentration of up to 5 moles/l is advantageous in view of safety.

The temperature of the electrolyte is preferably 10 to 100° C. and more preferably 10 to 40° C. When the temperature of the electrolyte is at least 10° C., efficiency in the electrolysis will be improved and operational cost will be advantageous. An electrolyte temperature of up to 100° C. is advantageous in the safety point of view.

The quantity of electricity in the liquid phase electrolytic oxidation is preferably controlled depending on the degree of carbonization of the carbon fiber and, when the liquid phase electrolytic oxidation is applied to the carbon fiber having a high modulus, a larger quantity of electricity is required.

Current density in the liquid phase electrolytic oxidation is preferably 1.5 to 1000 ampere/$m^2$ and more preferably 3 to 500 ampere/$m^2$ of the surface area of the carbon fiber in the electrolytic solution. When the current density is at least 1.5 ampere/m², efficiency in the electrolysis will be improved and operational cost will be advantageous while the current density of up to 1000 ampere/m² is advantageous in the safety point of view.

Total quantity of electricity used in the electrolytic treatment is preferably 3 to 300 coulomb/g of carbon fiber. When the quantity of electricity used in the electrolytic treatment is less than 3 coulomb/g, the carbon fiber surface may not be sufficiently provided with the functional group, and when measured by single-fiber composite fragmentation method, the number of fiber breaks may become less than 2.0/mm when apparent single-fiber stress is 15.3 GPa. On the other hand, when the quantity of electricity used in the electrolytic treatment is in excess of 300 coulomb/g, surface flaws of the carbon fiber single-fiber will be expanded, and number of fiber breaks when the apparent single-fiber stress of the single-fiber composite measured by the fragmentation method is 12.2 GPa may become in excess of 1.7/mm.

After the electrolytic treatment, the carbon fiber is preferably washed with water and dried. The methods which may be used for washing include dipping and spraying. Dipping in view of the ease of washing is preferred. Preferably, the carbon fiber is washed by dipping with ultrasonic vibration. Drying is preferably conducted at lowest possible temperature since excessively high temperature in the drying may adversely affect the functional group on the outermost surface of the carbon fiber which is susceptible to be lost by thermal degradation. More specifically, the temperature used in the drying is preferably up to 250° C., more preferably up to 210° C.

The prepreg comprises the sizing agent-coated carbon fiber bundle and a thermosetting resin. The thermosetting resin contains an epoxy compound (A) and an aromatic amine curing agent (B). The sizing agent-coated carbon fiber bundle exhibits a high OHT by the combination with the thermosetting resin containing the epoxy compound (A) and the aromatic amine curing agent (B).

The epoxy compound (A) used for the epoxy resin is not particularly limited, and at least one epoxy resin may be selected from bisphenol epoxy compound, amine epoxy compound, phenol novolac epoxy compound, cresol novolac epoxy compound, resorcinol epoxy compound, glycidylaniline epoxy compound, phenol aralkyl epoxy compound, naphthol aralkyl epoxy compound, dicyclopentadiene epoxy compound, epoxy compound having biphenyl skeleton, isocyanate-modified epoxy compound, tetraphenyl ethane epoxy compound, triphenylmethane epoxy compound, and the like.

The "bisphenol epoxy compound" is a bisphenol compound wherein the 2 phenolic hydroxy groups of the bisphenol compound have been glycidylated, and examples include bisphenol A epoxy compound, bisphenol F epoxy compound, bisphenol AD epoxy compound, bisphenol S epoxy compound, as well as these compounds substituted with a halogen or an alkyl and hydrogenated products thereof. In addition, the epoxy compound is not limited to a monomer, and it may also be a high molecular weight compounds having two or more constitutional repeating units are also preferable for use.

Exemplary commercially available bisphenol A epoxy compounds include "jER®" 825, 828, 834, 1001, 1002, 1003, 1003F, 1004, 1004AF, 1005F, 1006FS, 1007, 1009, and 1010 manufactured by Mitsubishi Chemical Corporation. Exemplary brominated bisphenol A epoxy compounds include "jER®" 505, 5050, 5051, 5054, and 5057 manufactured by Mitsubishi Chemical Corporation. Exemplary commercially available hydrogenated bisphenol A epoxy compounds include ST5080, ST4000D, ST4100D, and ST5100 manufactured by Nippon Steel Chemical Co., Ltd.

Exemplary commercially available bisphenol F epoxy compounds include "jER®" 806, 807, 4002P, 4004P, 4007P, 4009P, and 4010P manufactured by Mitsubishi Chemical Corporation, "EPICLON®" 830 and 835 manufactured by DIC Corporation, and "Epototo®" YDF2001 and YDF2004 manufactured by Nippon Steel Chemical Co., Ltd. Exemplary tetramethylbisphenol F epoxy compound include YSLV-80XY (manufactured by Nippon Steel Chemical Co., Ltd.).

Exemplary bisphenol S epoxy compounds include "EPICLON®" EXA-154 (manufactured by DIC Corporation).

Exemplary amine epoxy compounds include tetraglycidyldiaminodiphenylmethane, triglycidylaminophenol, triglycidylaminocresol, tetraglycidylxylylenediamine, substitution products of such compound with a halogen or an alkynol, and hydrogenation products.

Exemplary commercially available tetraglycidyl diaminodiphenylmethane include "Sumiepoxy®" ELM434 manufactured by SUMITOMO CHEMICAL COMPANY, LIMITED, YH434L manufactured by Nippon Steel Chemical Co., Ltd., "jER®" 604 manufactured by Mitsubishi Chemical Corporation, "Araldite®" MY720, MY721, and MY725 manufactured by Huntsman Advanced Materials K.K. Exemplary commercially available triglycidylaminophenol and triglycidylaminocresol include "Sumiepoxy®" ELM100 and ELM120 manufactured by SUMITOMO CHEMICAL COMPANY, LIMITED, "Araldite®" MY0500, MY0510, MY0600, and MY0610 manufactured by Huntsman Advanced Materials K.K., and "jER®" 630 manufactured by Mitsubishi Chemical Corporation. Exemplary commercially available tetraglycidylxylylenediamine and its hydrogenated products include TETRAD-X and TETRAD-C manufactured by MITSUBISHI GAS CHEMICAL COMPANY, INC.

Exemplary commercially available phenol novolac epoxy compounds include "jER®" 152 and 154 manufactured by Mitsubishi Chemical Corporation and "EPICLON®" N-740, N-770, and N-775 manufactured by DIC Corporation.

Exemplary commercially available cresol novolac epoxy compounds include "EPICLON®" N-660, N-665, N-670, N-673, and N-695 manufactured by DIC Corporation, EOCN-1020, EOCN-1025, and EOCN-1045 manufactured by Nippon Kayaku Co., Ltd.

Exemplary commercially available resorcinol epoxy compounds include "Denacol®" EX-201 manufactured by Nagase ChemteX Corporation.

Exemplary commercially available glycidylaniline epoxy compounds include GAN and GOT manufactured by Nippon Kayaku Co., Ltd.

Exemplary commercially available epoxy compounds having biphenyl skeleton include "jER®" YX4000H, YX4000, and YL6616 manufactured by Mitsubishi Chemical Corporation and NC-3000 manufactured by Nippon Kayaku Co., Ltd.

Exemplary commercially available dicyclopentadiene epoxy compounds include "EPICLON®" HP7200L, "EPICLON®" HP7200, "EPICLON®" HP7200H, and "EPICLON®" HP7200HH manufactured by Dainippon Ink and Chemicals, Incorporated, XD-1000-L and XD-1000-2L manufactured by Nippon Kayaku Co., Ltd., and "Tactix®" 556 manufactured by Huntsman Advanced Materials K.K.

Exemplary commercially available isocyanate-modified epoxy compounds include XAC4151 and AER4152 having oxazolidone ring manufactured by Asahi Kasei Epoxy Co., Ltd. and ACR1348 manufactured by ADEKA CORPORATION.

Exemplary commercially available tetraphenylethane epoxy compounds include "jER®" 1031 manufactured by Mitsubishi Chemical Corporation which is a tetrakis(glycidyloxyphenyl)ethane epoxy compound.

Exemplary commercially available triphenylmethane epoxy compounds include "Tactix®" 742 manufactured by Huntsman Advanced Materials K.K.

Use as the epoxy compound (A) of a polyfunctional glycidyl amine epoxy compound is particularly preferable since this compound is capable of greatly improving the OHT of the carbon fiber-reinforced composite material when used in combination with the sizing agent-coated carbon fiber bundle. Although the reason is not necessarily clear, we believe that, when such epoxy compound is used, the strength distribution of the high strength range in the carbon fiber has great influence on the OHT.

Exemplary polyfunctional glycidyl amine epoxy compounds include tetraglycidyldiaminodiphenylmethane, triglycidylaminophenol, triglycidylaminocresol, N,N-diglycidylaniline, N,N-diglycidyl-o-toluidine, N,N-diglycidyl-4-phenoxyaniline, N,N-diglycidyl-4-(4-methylphenoxy)aniline, N,N-diglycidyl-4-(4-tert-butylphenoxy)aniline, and N,N-diglycidyl-4-(4-phenoxyphenoxy)aniline. These compounds are mostly obtained by the addition of epichlorohydrin to a phenoxyaniline derivative followed by cyclization by an alkaline compound. Since the viscosity increases with an increase in the molecular weight, particularly preferred is N,N-diglycidyl-4-phenoxyaniline in view of the handling convenience.

Exemplary phenoxyaniline derivatives include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy)aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphthyloxyphenoxy)aniline, 4-(1-naphthyloxyphenoxy)aniline, 4-[(1,1'-biphenyl-4-yl)oxy]aniline, 4-(4-nitrophenoxy)aniline, 4-(3-nitrophenoxy)aniline, 4-(2-nitrophenoxy)aniline, 3-nitro-4-aminophenylphenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy)aniline.

Exemplary commercially available tetraglycidyl diaminodiphenylmethanes which may be used include "Sumiepoxy®" ELM434 manufactured by SUMITOMO CHEMICAL COMPANY, LIMITED, YH434L manufactured by Tohto Kasei Co., Ltd., "Araldite®" MY720, MY721, and MY725 manufactured by Huntsman Advanced Materials K.K., and "jER® 604" manufactured by Mitsubishi Chemical Corporation. Exemplary triglycidylaminophenols and triglycidylaminocresols include "Sumiepoxy®" ELM100 manufactured by SUMITOMO CHEMICAL COMPANY, LIMITED, "Araldite®" MY500 and MY0510 and "Araldite®" MY0600 and MY610 manufactured by Huntsman Advanced Materials K.K., and "jER®" 630 manufactured by Mitsubishi Chemical Corporation.

Of the polyfunctional glycidyl amine epoxy compounds as described above, preferred is aromatic epoxy compound (A1) having at least 1 glycidyl amine skeleton and the epoxy group having 3 or more functional groups.

The proportion of the polyfunctional glycidyl amine aromatic epoxy compound (A1) is preferably 30 to 100% by weight, and more preferably at least 50% by weight in the epoxy compound (A). The proportion of the polyfunctional glycidyl amine aromatic epoxy compound (A1) of at least 30% by weight is preferable in view of improving the OHT of the carbon fiber-reinforced composite material.

The aromatic amine curing agent (B) is not particularly limited as long as it is an aromatic amine used as an epoxy resin curing agent. Examples include 3,3'-diaminodiphenylsulfone (3,3'-DDS), 4,4'-diaminodiphenylsulfone (4,4'-DDS), diaminodiphenylmethane (DDM), 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and 2-ethylhexanenate of 2,4,6-tris(dimethylaminomethyl)phenol, which may be used alone or in combination of two or more.

The combination of the sizing agent used in the sizing agent-coated carbon fiber and the aromatic amine curing agent (B) is preferably those as described below. When the sizing agent and the aromatic amine curing agent (B) are mixed so that the ratio of the amine equivalent and the epoxy equivalent of the sizing agent and the aromatic amine curing agent (B) (amine equivalent/epoxy equivalent) is 0.9, and the mixture is stored under the environment of the temperature of 25° C. and the humidity of 60% for 20 days, the increase in the glass transition temperature of the mixture is up to 25° C. The increase of the glass transition temperature of up to 25° C. is preferable since the reaction between the outer layer of the sizing agent and the matrix resin will be suppressed after the production of the prepreg, and decrease of OHT of the carbon fiber-reinforced composite material after prolonged storage of the prepreg will be suppressed. The increase of the glass transition temperature is preferably up to 15° C., and more preferably up to 10° C. The glass transition temperature can be determined by differential scanning calorimetry (DSC).

The total amount of the aromatic amine curing agent (B) is preferably an amount such that the active hydrogen group is 0.6 to 1.2 equivalents, and more preferably 0.7 to 0.9 equivalent in relation to 1 equivalent of the epoxy group in all epoxy resin component. The "active hydrogen group" means a functional group capable of reacting with the epoxy group. When the active hydrogen group is less than 0.6 equivalent, the cured product will have an insufficient reaction rate, heat resistance, and modulus, and the carbon fiber-reinforced composite material may suffer from insufficient glass transition temperature and OHT. When the active hydrogen group is in excess of 1.2 equivalents, the cured product will have sufficient reaction rate, glass transition temperature, and modulus, while impact strength of the carbon fiber-reinforced composite material may be insufficient due to the insufficient plastic deformation ability.

The prepreg preferably has a thermoplastic resin incorporated therein to adjust toughness and flowability. In view of the heat resistance, preferred is incorporation of at least 1 member selected from polysulfone, polyether sulfone, polyetherimide, polyimide, polyamide, polyamide imide, polyphenylene ether, phenoxy resin, and polyolefin. The prepreg may also contain an oligomer of the thermoplastic resin incorporated therein, and the prepreg may also contain an elastomer, filler, or other additives. The thermoplastic resin is preferably the one included in the epoxy resin constituting the prepreg. The thermoplastic resin may also contain a thermoplastic resin soluble in the epoxy resin, and organic particles such as rubber particles and thermoplastic resin particles. Exemplary preferable thermoplastic resins soluble in the epoxy resin include a thermoplastic resin having a functional group capable of forming hydrogen bond which can be expected to improve the adhesion between the resin and the carbon fiber.

Exemplary thermoplastic resins soluble in the epoxy resin and having a functional group capable of forming hydrogen bond that can be used include thermoplastic resin having alcoholic hydroxy group, thermoplastic resin having amide bond, and thermoplastic resin having sulfonyl group.

Examples of the thermoplastic resin having alcoholic hydroxy group include polyvinyl acetal resins such as polyvinyl formal and polyvinyl butylal, polyvinyl alcohol, and phenoxy resin. Examples of the thermoplastic resin having amide bond include polyamide, polyimide, and polyvinylpyrrolidone, and examples of the thermoplastic resin having sulfonyl group include polysulfone. The polyamide, polyimide, and polysulfone may also have ether bond or a functional group such as carbonyl group in their backbone, and the polyamide may have a substituent on the nitrogen atom of the amide group.

Examples of commercially available thermoplastic resin having a hydrogen bonding functional group which is soluble epoxy resin include polyvinyl acetal resins such as Denka butylal manufactured by Denki Kagaku Kogyo Kabushiki Kaisha and "Vinylec®" manufactured by Chisso Corporation, phenoxy resins such as "UCAR®" PKHP manufactured by Union Carbide, polyamide resin such as "Macromelt®" manufactured by Henkel Hakusui Corporation, and "AMILAN®" manufactured by Toray Industries, Inc., polyimides such as "ULTEM®" manufactured by SABIC Innovative Plastics Japan LLC, "Matrimid®" 5218 manufactured by CIBA, polysulfones such as "SUMIKAEXEL®" manufactured by SUMITOMO CHEMICAL COMPANY, LIMITED, "UDEL®", "RADEL®" manufactured by SOLVAY ADVANCED POLYMERS, and polyvinylpyrrolidones such as "Luviscol®" manufactured by BASF Japan Ltd.

In view of high compatibility with the epoxy resin and suitability for use in adjusting flowability such as thickening, acrylic resins are also preferable. Examples of the commercially available acrylic resins include "DIANAL®" BR series manufactured by Mitsubishi Rayon Co., Ltd., "Matsumoto Microsphere®(Registered Trademark)" M, M100, and M500 manufactured by Matsumoto Yushi-Seiyaku Co., Ltd., and "Nanostrength®" E40F, M22N, and M52N manufactured by ARKEMA K.K.

In view of improving the OHT and fully exploiting the characteristic features of the sizing agent-coated carbon fiber bundle, particularly preferred are polyether sulfone and polyetherimide. Examples of the polyether sulfone which may be used include "SUMIKAEXEL"® 3600P, "SUMIKAEXEL"® 5003P, "SUMIKAEXEL"® 5200P, and "SUMIKAEXEL"® 7200P manufactured by Sumitomo Chemical Co. Ltd., "Virantage"® PESU VW-10200 and "Virantage"® PESU VW-10700 ® manufactured by SOLVAY ADVANCED POLYMERS, and "Ultrason"® 2020SR manufactured by BASF, and examples of the polyetherimide include "ULTEM"® 1000, "ULTEM"® 1010, and "ULTEM"® 1040 manufactured by SABIC Innovative Plastics Japan LLC.

Preferably, the thermoplastic resin is uniformly dissolved or micro-dispersed in the form of particles in the epoxy resin composition particularly in view of impregnation to thereby facilitate the prepreg production.

With regard to the amount of the thermoplastic resin incorporated in the epoxy resin composition, when the thermoplastic resin is dissolved in the epoxy resin composition, the thermoplastic resin is preferably incorporated at an amount of 6 to 40 parts by weight, and more preferably at 6 to 25 parts by weight in relation to 100 parts by weight of the epoxy resin. When the thermoplastic resin is used by dispersing in the epoxy resin composition, the thermoplastic resin is preferably incorporated at an amount of 10 to 40 parts by weight, and more preferably at 15 to 30 parts by weight in relation to 100 parts by weight of the epoxy resin. An amount of the thermoplastic resin less than or in excess of such amount may result in the reduced OHT.

Next, the preferred method of producing the prepreg is described. The prepreg is a prepreg prepared by impregnating a matrix resin in the carbon fiber bundle having a sizing agent coated thereon (the sizing agent-coated carbon fiber bundle). The prepreg may be produced, for example, by a wet method wherein viscosity of the matrix resin is reduced by dissolving in a solvent such as methyl ethyl ketone or methanol and then impregnated in the sizing agent-coated carbon fiber bundle, or by a hot melt method wherein viscosity of the matrix resin is reduced by heating and then impregnated in the sizing agent-coated carbon fiber bundle.

In the wet method, the sizing agent-coated carbon fiber bundle is dipped in the liquid containing the matrix resin and, after recovering from the liquid, the solvent may be evaporated, for example, by using an oven to thereby obtain the prepreg.

In the hot melting method, the prepreg may be produced by a method wherein the matrix resin whose viscosity has been reduced by heating is directly impregnated in the sizing agent-coated carbon fiber bundle, or by a method wherein a film comprising a release paper or the like and the matrix resin coated on such release paper is first prepared, and this film is placed on one side or on both sides of the sizing agent-coated carbon fiber bundle, and the matrix resin is impregnated into the sizing agent-coated carbon fiber bundle by applying heat and pressure. This hot melting is the preferred means since no solvent is left in the prepreg.

Formation of a carbon fiber-reinforced composite material using the prepreg may be accomplished, for example, by laminating the prepreg, and applying pressure to the laminate to thermally cure the matrix resin. The prepreg is well adapted for use in members of aircraft, spacecraft, automobile, and ships as well as sports applications such as golf shaft and fishing rod and other general industrial applications.

Various mechanical properties described in this specification were measured by the methods as described below.

(A) Measurement of the Sizing Agent Surface of the Sizing Agent-Coated Carbon Fiber Bundle by X-Ray Photoelectron Spectroscopy The peak ratio (a) to (b) of the sizing agent surface of the sizing agent-coated fiber was determined by X-ray photoelectron spectroscopy by the procedure as described below. The sizing agent-coated carbon fiber bundle was cut to 20 mm, and spread on a copper sample table. Then, by maintaining the sample chamber at $1\times10^{-8}$ Torr, the measurement was conducted by using $AlK\alpha_{1,2}$ for the X-ray source. The binding energy value of the main peak of C1s as the peak correction value with the electric charge in the measurement was set at 286.1 eV. The peak area C1s was determined by depicting a base line (a straight line) of 282 to 296 eV. By defining the base line (straight line) of 282 to 296 eV used in determining the area in the C1s peak as the origin point (zero point) of the photoelectron strength, b) height (cps, photoelectron intensity per unit time) of the component at the binding energy of 286.1 eV corresponding to C—O and (a) height (cps) of the component at the binding energy of 284.6 eV corresponding to CHx, C—C, and C=C were determined, and peak height ratio of (a)/(b) was calculated.

When the peak (a) is higher than the peak (b), and the binding energy value of the main peak of C1s is set at 286.1, the peak of the C1s will not be 282 to 296 eV. In such a case, the binding energy value of the main peak of C1s is set at 284.6 eV, and then, (a)/(b) was calculated by the procedure as described above.

(B) Tensile Strength and Tensile Modulus of Resin-Impregnated Strands of the Carbon Fiber Bundle The tensile strength and tensile modulus of resin-impregnated strands of the carbon fiber bundle were determined by the following procedure according to a test method of resin-impregnated strand defined in JIS-R-7608 (2004). The resin used was a 100/3/4 (parts by weight) blend of "CELLOXIDE®" 2021P (manufactured by DAICEL CHEMICAL INDUSTRIES, LTD.)/boron trifluoride monoethylamine (manufactured by Tokyo Chemical Industry Co., Ltd.)/acetone, and the curing condition used included normal pressure, temperature of 125° C., and time of 30 minutes. 10 strands of carbon fiber bundle were measured, and the average was used for the tensile strength and tensile modulus of the resin-impregnated strands.

(C) Surface Oxygen Concentration (O/C) of the Carbon Fiber

The Surface Oxygen Concentration (O/C) of the Carbon Fiber was Determined by X-Ray photoelectron spectroscopy by the following procedure. First, the carbon fiber having the dirt deposited on the surface removed by using a solvent was cut to about 20 mm and spread on a copper sample table. This sample table was placed in a sample chamber and the sample chamber was maintained at $1\times10^{-8}$ Torr. Next, the measurement was conducted at a photoelectron takeoff angle of 90° by using $AlK\alpha_{1,2}$ for the X-ray source. The binding energy value of the main peak (peak top) of C1s as the peak correction value with the electric charge in the measurement was set at 286.1 eV. The peak area C1s was determined by depicting a base line (a straight line) of 282 to 296 eV, and the peak area O1s was determined by depicting a base line (a straight line) of 528 to 540 eV. The surface oxygen concentration is a value calculated as an atom number ratio from the ratio of the peak area O1s to the peak area C1s by using a sensitivity correction value specific to the apparatus. The X-ray photoelectron spectroscopy apparatus used was ESCA-1600 manufactured by ULVAC-PHI, Inc., and the sensitivity correction value specific to the apparatus was 2.33.

(D) Fragmentation Method

The measurement of the number of fiber breaks by fragmentation method was conducted by the following (i) to (v).

(i) Preparation of the Resin 190 parts by weight of bisphenol A epoxy resin compound "Epototo YD-128" (manufactured by Nippon Steel Chemical Co., Ltd.) and 20.7 parts by weight of diethylenetriamine (manufactured by Wako Pure Chemical Industries, Ltd.) were placed in a container, and after mixing with a spatula, the mixture was deaerated by using an automatic vacuum defoamer.

(ii) Sampling of the Carbon Fiber Single-Fiber and Fixing to the Mold

The carbon fiber bundle having a length of about 20 cm was divided into substantially equal 4 bundles, and the filament was sequentially sampled one by one from each of the 4 bundles so that the filaments were sampled from the entire bundle as evenly as possible. Next, a double sided tape was attached along opposite ends of the sheet having an open hole, and the sampled single-fibers were secured to the sheet with certain tension applied to the single-fibers. Next, a glass plate having a polyester film "LUMIRROR®" manufactured by Toray Industries, Inc. adhered thereto was prepared, and a spacer having a thickness of 2 mm to adjust the thickness of the test piece was secured on the film. On this spacer, the sheet having an open hole having the single-fibers fixedly secured thereto was placed, and another glass plate having a polyester film adhered thereto was placed on the sheet with the film side on the down side. In this process, a tape having a thickness of approximately 70 µm was attached along opposite ends of the film to control the embedding depth of the fiber.

(iii) Casting to Curing of the Resin

The resin prepared by the procedure of the above (i) was cast in the mold (the space surrounded by the spacer and the films) prepared by the procedure of the above (ii). The mold having the resin cast therein was heated for 5 hours by using an oven preheated to 50° C., and the temperature was then reduced to 30° C. at a temperature reducing rate of 2.5° C./minute. After releasing from the mold and cutting, a test piece of 2 cm×7.5 cm×0.2 cm was obtained. Cutting was conducted so the single-fibers would be placed within the area with the width of 0.5 cm at the center in the width direction of the test piece.

(iv) Measurement of the Embedding Depth of the Fiber

The embedding depth of the fiber was measured for the test piece obtained by the procedure of the above (iii) by using the laser of a laser Raman spectrophotometer (JASCO Corporation NRS-3000) and a 532 nm notch filter. First, the surface of the single-fiber was irradiated with a laser beam and the stage height was adjusted to minimize the diameter of the laser beam diameter. This stage height is designated "A" (µm). Next, the surface of the test piece was irradiated with a laser beam and the stage height as adjusted to minimize the diameter of the laser beam diameter. This stage height is designated "B" (µm). The embedding depth d (µm) of the fiber was calculated by using refractive index 1.732 of the resin measured by using the laser as described above by the following equation:

$$d=(A-B)\times 1.732$$

(v) 4 Point Bending Test

The test piece obtained by the procedure of the above (iii) was applied with the tensile strain by the 4 point bending test method using a jig having outer indenters provided at an interval of 50 mm and inner indenters provided at an interval of 20 mm. Strain was applied in stepwise manner by an increment of 0.1%, and the test piece was observed by a polarization microscope to measure the number of broken single-filaments in the area with the width of 10 mm at the center in the longitudinal direction of the test piece. The number of broken single-filaments divided by 10 was used for the number of fiber breaks (filaments/mm). The strain $\epsilon$(%) was also measured by using a strain gauge attached at a position 5 mm in the width direction from the center of the test piece. Final strain $\epsilon_c$ of the single-fiber composites was calculated by considering gauge factor $\kappa$ of the strain gauge, the embedding depth d (μm) of the fiber measured by the procedure of the above (iv), and the residual strain of 0.14(%) by the following equation:

$$\epsilon_c=\epsilon\times(2/\kappa)\times(1000-d)/1000-0.14$$

The test number n was 30.

(E) Single-Fiber Modulus of the Carbon Fiber

The single-fiber modulus of the carbon fiber is determined by the procedure as described below according to JIS R7606 (2000). First, a carbon fiber bundle of approximately 20 cm is divided into 4 bundles, and single-filament is sequentially sampled one by one from each of the 4 bundles so that the filaments are sampled from the entire bundle as evenly as possible. The sampled single-filaments are fixedly secured to a sheet having an open hole with an adhesive. The sheet having the single-filaments secured is mounted on a tensile tester, and the tensile test is conducted at a gauge length of 50 mm, a strain rate of 2 mm/minute, and sample number of 20. The modulus is determined by the following equation.

Modulus=(resulting strength)/(cross sectional area of the single-fiber×resulting elongation)

The cross sectional area of the single-fiber for the fiber bundle to be measured is determined by dividing mass per unit length (g/m) by density (g/m³), and further dividing by the filament number. The density was measured by Archimedean method by using o-dichloroethylene for the specific gravity solution.

(F) Open Hole Tensile Strength

The measurement was conducted according to ASTM D5766 (Open-hole Tensile Strength of Polymer Matrix Composite Laminates)

a. Test Condition

Room temperature condition (RTD): 69° F. (20.6° C.)±5° F.

Low temperature condition (LTD): −75° F. (−59.4° C.)±5° F.

b. Laminate Constitution 16 ply $(45/90/-45/0)_{2s}$ c. Molding Condition

The prepreg was cut to the predetermined size, and laminated according to the constitution of the above "b". The resulting laminate was covered by a bagging film, and the temperature was elevated in an autoclave at a temperature elevation speed of 1.5° C./min to 180° C. while degassing the interior of the laminate to conduct the curing at a pressure of 6 atm for 2 hours. A pseudo-isotropic reinforced material (carbon fiber composite material) was thereby obtained.

d. Sample Size

Dimensions: 308 mm (length)×38.1 mm (width)×4.5 mm (thickness)

(G) Tearable Length

The method used in measuring the tearable length is shown in FIG. 1. The fiber bundle 1 is cut at a length of 1160 mm, and one end 2 is fixedly secured on a horizontal table with an adhesive tape so that the this end is not movable (This point is designated fixed point A). The other non-fixed end 3 of the fiber bundle is divided into two bundles by finger, and one bundle is secured to the table with an adhesive tape in a tightly stretched state (This point is designated fixed point B). The other end of the divided bundle is pivoted on the table with no slack around the fixed point A, and that other end is stopped at position 4 where the distance in a straight line from the fixed point B is 500 mm and fixedly secured on the table with an adhesive tape (This point is designated fixed point C). The area surrounded by the fixed points A, B, and C is visually observed, and after finding interlacing point 5 farthest from the fixed point A, length projected onto the straight line between the fixed point A and the fixed point B is read by using a ruler with minimum scale of 1 mm. This length is designated the tearable length 6. This measurement is repeated 30 times, and the arithmetic mean value of the measurement is used as the average tearable length. In this measurement method, the interlacing point farthest from the fixed point A is the point which is farthest from the fixed point A in straight line distance where 3 or more single-fibers with no slacking are interlaced with each other.

(H) Degree of Interlace (CF Value) Measured by Hook Drop Method

The degree of interlace of the fiber bundle by hook drop method is measured by the procedure as described below according to JIS L1013 (2010). First, the fiber bundle measured is fixed to the upper part of the hanger device by a clip, and a weight (spindle) is secured to the lower end of the fiber bundle by a clip to vertically hang the sample. A hook with a smooth surface having a diameter of 0.6 mm and a weight of 10 g is inserted in the fiber bundle at a position 1 cm downward from the fixed upper end of the sample so that the hook divides the bundle into two bundles, and the distance of the hook downward movement was measured 50 times. The degree of interlace is calculated from its arithmetic mean value by the following equation:

Degree of interlace(CF value)=1000/arithmetic mean value of the 50 measurements of the hook downward movement distance(mm)

(I) Coefficient of Kinetic Friction

The coefficient of kinetic friction between the polyacrylonitrile precursor fiber bundles is measured by the procedure as described below. First, the polyacrylonitrile precursor fiber bundle is continuously wound around a cylinder having a diameter 150 mm so that the fiber bundle is parallel to the axis of the cylinder, and another fiber bundle of the same type is then hung around at the center of the cylinder so that contact angle with the fiber bundle as described above is 180°. A weight of 1500 g (W) is attached to one end of the fiber bundle hung around the cylinder, and the fiber bundle is moved at a speed of 2.3 m/minute to measure the tension (T) at the other end of the fiber bundle. The coefficient of kinetic friction between the fiber bundles is determined by the following equation:

Coefficient of kinetic friction $\mu=(T-W)/(T+W)$ (J) Number of Broken Single-Filaments The number of broken single-filaments of the carbon fiber bundle is determined by the procedure as described below. First, a carbon fiber bundle of 3.8 m is observed and the number of all broken single-filaments that can be observed from the exterior is counted. This total count is divided by 3.8 to calculate the number of broken single-filaments per meter. The measurement is conducted 6 times, and the average of 6 measurements is defined the number of broken single-filaments (number/m).
(K) Bundle Strength of the Carbon Fiber Bundle at Gauge Length of 10 m The bundle strength at gauge length of 10 m is measured by the following procedure. First, a pair of drive rolls is provided so that the distance between the roll top point is 10 m. The fiber bundle measured is placed over the drive rolls, and one drive roll is rotated at 70 mm/minute while stopping the other drive roll to thereby conduct the tensile test. The tension of the fiber bundle in the tensile test is measured by tensiometer, and the maximum tension measured in the course until the breakage is defined as the bundle strength. The arithmetic mean value of 10 measurements was used for the 10 m bundle strength. The contact angle and the roll material are adequately selected so that the fiber bundle does not slip on the drive rolls.
(L) Crystallite Size Lc of the Carbon Fiber Bundle The carbon fibers used in the measurement are aligned and fixed by using alcohol solution of collodion to prepare a measurement sample of quadrangular prism (length, 4 cm; side length, 1 mm). The thus prepared measurement sample is measured with a wide angle X ray diffractometer under the following conditions:

X-ray source: CuKα ray (tube voltage 40 kV, tube current 30 mA),
Detector: goniometer+monochromator+scintillation counter,
Scan range: 2θ=10 to 40°
Scan mode: step scan; step unit, 0.02°; counting time, 2 seconds In the thus obtained diffraction pattern, half-width is determined for the peak near the 2θ=25 to 26°, and the crystallite size is calculated from this value by the following Scherrer's equation:

$$\text{Crystallite size (nm)} = K\lambda/\beta_0 \cos\theta_B$$

with the proviso
K: 1.0, λ: 0.15418 nm (wavelength of the X ray)
$\beta_0$: $(\beta_E^2 - \beta_1^2)^{1/2}$
$\beta_E$: apparent half-width (measurement) rad,
$\beta_1$: $1.046 \times 10^{-2}$ rad
$\theta_B$: Bragg's diffraction angle The measurement as described above is conducted 3 times, and the arithmetic mean used for the crystallite size of the carbon fiber. In the Examples and Comparative Examples as described below, XRD-6100 manufactured by SHIMADZU CORPORATION was used for the wide angle X-ray diffractometer.

EXAMPLES

Next, our bundles, prepregs, and methods are described in further detail by referring to Examples which by no means limit the scope of this disclosure.

The materials and components used in the Examples and Comparative Examples are as described below.
Component (C): C-1 to C-3
 C-1: "Denacol®" EX-810 manufactured by Nagase ChemteX Corporation
  diglycidyl ether of ethylene glycol epoxy equivalent: 113 g/mol, number of epoxy groups: 2
 C-2: "Denacol®" EX-611 manufactured by Nagase ChemteX Corporation
  sorbitol polyglycidyl ether
  epoxy equivalent: 167 g/mol, number of epoxy groups: 4
  Number of hydroxy groups: 2
 C-3: "Denacol®" EX-521 manufactured by Nagase ChemteX Corporation
  polyglycerin polyglycidyl ether
  epoxy equivalent: 183 g/mol, number of epoxy groups: 3 or more
Component (D): D-1 to D-3
 D-1: "jER®" 828 manufactured by Mitsubishi Chemical Corporation
  diglycidyl ether of bisphenol A
  epoxy equivalent: 189 g/mol, number of epoxy groups: 2
 D-2: "jER®" 1001 manufactured by Mitsubishi Chemical Corporation
  diglycidyl ether of bisphenol A
  epoxy equivalent: 475 g/mol, number of epoxy groups: 2
 D-3: "jER®" 807 manufactured by Mitsubishi Chemical Corporation
  diglycidyl ether of bisphenol F
  epoxy equivalent: 167 g/mol, number of epoxy groups: 2
Component (A): A-1 to A-3
 A-1: "Sumiepoxy®" ELM434 manufactured by SUMITOMO CHEMICAL COMPANY, LIMITED
  tetraglycidyl diaminodiphenylmethane
  epoxy equivalent: 120 g/mol
 A-2: "jER®" 828 manufactured by Mitsubishi Chemical Corporation
  diglycidyl ether of bisphenol A
  epoxy equivalent: 189 g/mol
 A-3: GAN manufactured by Nippon Kayaku Co., Ltd.
  N-diglycidylaniline
Component (B):
 "SEIKACURE®" S
 (4,4'-diaminodiphenylsulfone, manufactured by Wakayama Seika Co., Ltd.)
Thermoplastic Resin
 "SUMIKAEXEL®" 5003P manufactured by SUMITOMO CHEMICAL COMPANY, LIMITED
  polyether sulfone Examples 1 to 16 and Comparative Examples 1 to 26

This Example comprises the following four steps:
step I: the step of producing the carbon fiber used for the starting material; step II: the step of conducting the surface treatment of the carbon fiber; step III: the step of depositing the sizing agent on the carbon fiber; and IV: the step of producing the prepreg.
Step I A monomer mixture comprising 99.5 mol % of acrylonitrile and 0.5 mol % of itaconic acid was polymerized by solution polymerization by using dimethyl sulfoxide for the solvent and 2,2'-azobisisobutyronitrile for the initiator to produce a polyacrylonitrile copolymer having a weight average molecular weight of 700,000 and Mz/Mw of 1.8. To the thus produced polyacrylonitrile polymer, ammonia gas was introduced until the pH was 8.5 and polymer concentration was adjusted to 15% by weight to prepare spinning solution. The resulting spinning solution was then subjected to dry-wet spinning by extruding at 40° C. into air from a spinneret having a diameter of 0.15 mm and a spinneret hole number of 6,000, and the extruded solution was passed through a space of about 4 mm and introduced in a coagulation bath of 35% aqueous solution of dimethyl sulfoxide controlled to 3° C. to obtain a solidified yarn. The solidified yarn was washed with water by the method commonly used in the art, and the yarn was then drawn 3.5 times in double hot water bath. To this fiber bundle drawn in the water bath, an amino-modified silicone oil agent was applied, and a compacting treatment by drying was conducted by using heating rollers at 160° C. After bringing 2 yarns together so that the single-fiber number was 12,000, the fiber bundle was drawn 3.7 times in high pressure steam so that the total drawing after the spinning was 13 times. The fiber bundle was then interlaced to obtain a polyacrylonitrile precursor fiber comprising 12000 single-fibers each having a single-fiber fineness of 0.7 dtex. The interlacing treatment was conducted by using a fluid spray nozzle having 8 ejection orifices arranged around the fiber bundle so that the fluid spray direction was at 90° with the longitudinal direction of the fiber bundle and each ejection orifice faced another ejection orifice at opposite sides of the fiber bundle forming an ejection orifice pair, and using air for the fluid. In the interlacing, the conditions were adjusted so that the tension of the fiber bundle was 3 mN/dtex and the fluid ejection pressure was 0.35 MPa. Next, the fiber bundle was subjected to an oxidation treatment while drawing at a draw ratio of 1 in air at a temperature of 240 to 260° C. to obtain an oxidated fiber bundle having a specific gravity of 1.35 to 1.36. The resulting oxidated fiber bundle was subjected to pre-carbonization treatment by drawing at a draw ratio of 1.15 in a nitrogen atmosphere at a temperature of 300 to 800° C. to obtain a pre-carbonized fiber bundle, and the resulting pre-carbonized fiber bundle was subjected to carbonization treatment in a nitrogen atmosphere at the maximum temperature of 1500° C. and at a tension of 5.5 mN/dtex to obtain a carbon fiber. The thus obtained carbon fiber was designated carbon fiber A.

Another carbon fiber was produced by repeating the procedure of the carbon fiber A except that the interlacing treatment of the polyacrylonitrile precursor fiber was not conducted. The resulting carbon fiber was designated carbon fiber B.

Another carbon fiber was produced by repeating the procedure of the carbon fiber A except that a spinning solution having a weight average molecular weight of the polyacrylonitrile copolymer of 400,000, a Mz/Mw of 3.5, and a polymer concentration of 19% was obtained by adjusting the amount of the initiator or the timing of introduction in the solution polymerization, and such spinning solution was used. This carbon fiber was designated carbon fiber C.

Another carbon fiber was produced by repeating the procedure of the carbon fiber C except that the interlacing treatment of the polyacrylonitrile precursor fiber was not conducted. The resulting carbon fiber was designated carbon fiber D.

In addition to the carbon fibers A to D as described above, commercially available "TORAYCA®" T800S-24k-10E and "TORAYCA®" T700S-24k-50E manufactured by Toray Industries, Inc., "Hextow®" IM-10 manufactured by Hexcel, "Hextow®" IM-9 manufactured by Hexcel, and "TENAX®" IM600 manufactured by Toho Tenax Co., Ltd. were used for the analysis.

Step II

The carbon fiber obtained in step I was subjected to electrolytic surface treatment by using an aqueous solution of ammonium hydrogen carbonate having a concentration of 0.1 mole/1 for the electrolyte and at an electric quantity of 80 coulomb per g of the carbon fiber. The electrolytically surface treated carbon fiber was washed with water and dried in heated air at a temperature of 150° C. to obtain a surface treated carbon fiber. This surface treatment was designated surface treatment A. The surface oxygen concentration O/C in this surface treatment was 0.15.

The carbon fiber obtained in step I was subjected to electrolytic surface treatment by using an aqueous solution of ammonium hydrogen carbonate having a concentration of 0.1 mole/1 for the electrolyte and at an electric quantity of 500 coulomb per g of the carbon fiber. The electrolytically surface treated carbon fiber was washed with water and dried in heated air at a temperature of 150° C. to obtain a surface treated carbon fiber. This surface treatment was designated surface treatment B. The surface oxygen concentration O/C in this surface treatment was 0.22.

The carbon fiber obtained in step I was subjected to electrolytic surface treatment by using an aqueous solution of sulfuric acid having a concentration of 0.1 mole/1 for the electrolyte and at an electric quantity of 80 coulomb per g of the carbon fiber. The electrolytically surface treated carbon fiber was washed with water and dried in heated air at a temperature of 150° C. to obtain a surface treated carbon fiber. This surface treatment was designated surface treatment C. The surface oxygen concentration O/C in this surface treatment was 0.20.

The carbon fiber obtained in step I was subjected to electrolytic surface treatment by using an aqueous solution of nitric acid having a concentration of 0.1 mole/1 for the electrolyte and at an electric quantity of 80 coulomb per g of the carbon fiber. The electrolytically surface treated carbon fiber was washed with water and dried in heated air at a temperature of 150° C. to obtain a surface treated carbon fiber. This surface treatment was designated surface treatment D. The surface oxygen concentration O/C in this surface treatment was 0.14.

When the carbon fiber obtained in step I is not surface treated, this surface treatment is called the surface treatment E for convenience' sake. The surface oxygen concentration O/C in this surface treatment was 0.02.

Step III

An emulsion in water comprising 10 parts by weight of D-1, 10 parts by weight of D-2, 20 parts by weight of a condensation product of 2 moles of 2 mole EO adduct of bisphenol A, 1.5 moles of maleic acid, and 0.5 mole of sebacic acid, and 10 parts by weight of polyoxyethylene (70 moles) styrenated (5 moles) cumylphenol as an emulsifier was prepared as the component (D), and this component (D) was mixed with 50 parts by weight of C-3 as the component (C) to prepare a sizing solution. This sizing agent was coated on the surface treated carbon fiber obtained in the step II by dipping, and the coated carbon fiber was heat treated at a temperature of 210° C. for 75 seconds to obtain the sizing agent-coated carbon fiber bundle. The coating weight of the sizing agent was adjusted so that the sizing agent was 1.0 part by weight in relation to 100 parts by weight of the surface treated carbon fiber. This product was designated the sizing agent A. The surface of the sizing agent was measured by X-ray photoelectron spectroscopy at a photoelectron takeoff angle of 15° to obtain C1 s inner shell spectrum, and ratio (a)/(b) of (a) height (cps) of the component at the binding energy (284.6 eV) corresponding to CHx, C—C, and C=C to (b) height (cps) of the component at the binding energy (286.1 eV) corresponding to C—O was 0.67.

A sizing agent-coated carbon fiber bundle was obtained by repeating the procedure of the sizing agent A except that the coating weight of the sizing agent was adjusted to 0.2 part by weight in relation to 100 parts by weight of the surface treated carbon fiber. This product was designated the sizing agent B. The ratio (a)/(b) was 0.67.

A sizing agent-coated carbon fiber bundle was obtained by repeating the procedure of the sizing agent A except that the coating weight of the sizing agent was adjusted to 2.0 part by weight in relation to 100 parts by weight of the surface treated carbon fiber. This product was designated the sizing agent C. The ratio (a)/(b) was 0.67.

The product wherein the surface treated carbon fiber obtained in the step II was not coated with the sizing agent was designated the sizing agent D for convenience' sake.

A sizing agent-coated carbon fiber bundle was obtained by repeating the procedure of the sizing agent A except that the component D-1, the component D-2, the condensation product of 2 moles of 2 mole EO adduct of bisphenol A, 1.5 moles of maleic acid, and 0.5 mole of sebacic acid, and the component C-3 was changed from 10:10:20:50 to 22.5:22.5:45:0. This product was designated the sizing agent E. The ratio (a)/(b) was 0.99.

A sizing agent-coated carbon fiber bundle was obtained by repeating the procedure of the sizing agent A except that the amount of the component D-1, the component D-2, the condensation product of 2 moles of 2 mole EO adduct of bisphenol A, 1.5 moles of maleic acid, and 0.5 mole of sebacic acid, the component C-1, the component C-3, and the emulsifier was changed from 10 parts by weight:10 parts by weight:20 parts by weight:0:50 parts by weight:10 parts by weight to 0:0:0:50 parts by weight:50 parts by weight:0. This product was designated the sizing agent F. The ratio (a)/(b) was 0.26.

A sizing agent-coated carbon fiber bundle was obtained by repeating the procedure of the sizing agent A except that the component D-2 was changed to component D-3. This product was designated the sizing agent G. The ratio (a)/(b) was 0.63.

A sizing agent-coated carbon fiber bundle was obtained by repeating the procedure of the sizing agent E except that the amount of the component D-1, the component D-2, the condensation product of 2 moles of 2 mole EO adduct of bisphenol A, 1.5 moles of maleic acid, and 0.5 mole of sebacic acid, the component C-1, the component C-3, and the emulsifier was changed from component 0:0:0:50 parts by weight:50 parts by weight:0 to 20 parts by weight: 0:20 parts by weight:25 parts by weight:25 parts by weight:10 parts by weight. This product was designated the sizing agent H. The ratio (a)/(b) was 0.60.

A sizing agent-coated carbon fiber bundle was obtained by repeating the procedure of the sizing agent H except that the component C-1 was changed to component C-2. This product was designated the sizing agent I. The ratio (a)/(b) was 0.62.

Next, the sizing agent-coated carbon fiber bundle was evaluated by the strand strength test and the single-fiber modulus test as described above. In addition, as an accelerated test postulating actual conditions of use, the sizing agent-coated carbon fiber bundle was subjected to the fragmentation test after storing the sizing agent-coated carbon fiber bundle at a temperature of 70° C. and humidity of 95% for 3 days. The results are shown in Table 1.

Step IV

In a kneader, 35 parts by weight of (A-1), 35 parts by weight of (A-2), and 30 parts by weight of (A-3) as the component (A) and 14 parts by weight of "SUMIKAEXEL®" 5003P as the thermoplastic resin were blended and melted, and 40 parts by weight of 4,4'-diaminodiphenylsulfone was added as the component (B). The mixture was further kneaded to prepare an epoxy resin composition for carbon fiber-reinforced composite material. This resin composition was designated resin composition A.

The procedure of the resin composition A was repeated except that the amount of the SUMIKAEXEL 5003P blended was changed from 10 parts by weight to 5 parts by weight to prepare a resin composition. This resin composition was designated resin composition B.

The procedure of the resin composition A was repeated except that the compositional ratio of the (A-1):(A-2):(A-3):(B) was changed to 50 parts by weight: 50 parts by weight: 0:40 parts by weight to prepare a resin composition. This resin composition was designated resin composition C.

By using a knife coater, the resulting resin composition was coated on a release paper at a resin unit weight of 52 g/m² to prepare a resin film. This resin film was laid on opposite surfaces of the unidirectionally aligned sizing agent-coated carbon fiber bundle (unit weight, 190 g/m²), and the resin composition was impregnated in the sizing agent-coated carbon fiber bundle by applying heat and pressure at a temperature of 100° C. and an atmospheric pressure of 1 atm with a heat roll to thereby obtain a prepreg. The prepreg was stored at a temperature of 25° C. and humidity of 60% for 20 days to simulate the actual conditions in use, and the OHT test was conducted by forming a composite material. The results are shown in Table 2.

Figure 2:
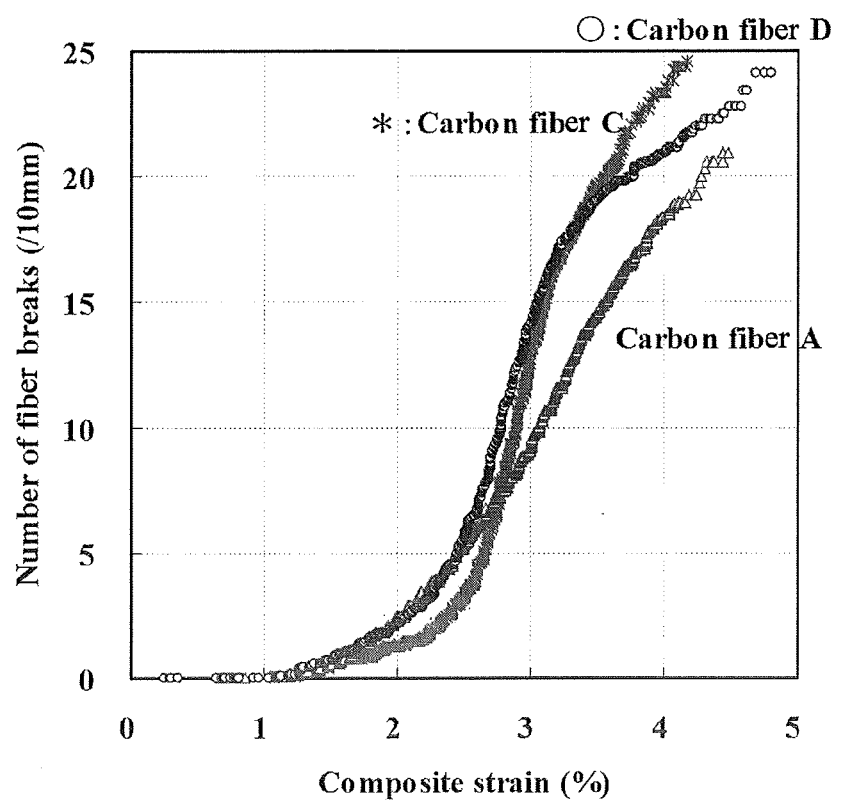
FIG. 2 is a view showing an exemplary result of the fragmentation test of the single-fiber composite using the sizing agent-coated carbon fiber bundle.

For the steps I to III, the evaluation results of the sizing agent-coated carbon fiber bundles produced as shown in Table 1 are also shown in Table 1, and the results of the fragmentation test of the Example 1 (Carbon fiber A), Comparative Example 2 (Carbon fiber C), and Comparative Example 3 (Carbon fiber D) are shown in FIG. 2. The evaluation results of the prepregs prepared by combining the sizing agent-coated carbon fiber bundle shown in Table 1 and the matrix resin are shown in Table 2. As indicated in Tables 1 and 2, the number of fiber breaks at an apparent single-fiber stress of 6.8 GPa tends to be smaller at the higher tensile strength of resin-impregnated strands, and the OHT particularly in the low temperature test tends to be higher at the smaller number of fiber breaks at an apparent single-fiber stress of at 12.2 GPa. Such OHT can be regarded as adequate in view of the OHT of approximately 600 MPa (=88 ksi) of "Hexply®" IM-10/M91 which has largest catalog value of the OHT (under the room temperature condition) in commercially available prepregs, and also in view of the fragmentation test results of the "Hextow®" IM-10 used in the Hexply.

TABLE 1

|  | Carbon fiber | Surface treatment | Sz | Fragmentation method, number of fiber breaks | | | | | | Tensile strength of resin-impregnated strands GPa | Single-filament modulus GPa | Average tearable length | |
|---|---|---|---|---|---|---|---|---|---|---|---|---|---|
|  |  |  |  | ε | | | σ | | | | | Pre-carbonized fiber bundle mm | Carbon fiber bundle mm |
|  |  |  |  | 2.0%/m | 3.6%/m | 4.5%/m | 6.8 GPa/m | 12.2 GPa/m | 15.3 GPa/m |  |  |  |  |
| Ex. 1 | A | A | A | 0.2 | 1.5 | 2.1 | 0.2 | 1.5 | 2.1 | 6.4 | 342 | 610 | 700 |
| Comp. Ex. 1 | B | A | A | 0.1 | 2.0 | 2.1 | 0.1 | 2.0 | 2.1 | 6.8 | 342 | 835 | 900 |

TABLE 1-continued

| | Carbon fiber | Surface treatment | Sz | Fragmentation method, number of fiber breaks ε 2.0%/m | 3.6%/m | 4.5%/m | σ 6.8 GPa/m | 12.2 GPa/m | 15.3 GPa/m | Tensile strength of resin-impregnated strands GPa | Single-filament modulus GPa | Average tearable length Pre-carbonized fiber bundle mm | Carbon fiber bundle mm |
|---|---|---|---|---|---|---|---|---|---|---|---|---|---|
| Comp. Ex. 2 | C | A | A | 0.1 | 2.0 | 2.6 | 0.1 | 2.0 | 2.6 | 7.3 | 342 | 620 | 710 |
| Comp. Ex. 3 | D | A | A | 0.2 | 2.0 | 2.3 | 0.2 | 2.0 | 2.3 | 6.8 | 342 | 870 | 930 |
| Comp. Ex. 4 | A | B | A | 0.05 | 2.1 | 2.5 | 0.05 | 2.1 | 2.5 | 5.4 | 342 | 610 | 700 |
| Ex. 2 | A | C | A | 0.1 | 1.5 | 2.3 | 0.1 | 1.5 | 2.3 | 6.3 | 342 | 610 | 700 |
| Ex. 3 | A | D | A | 0.05 | 1.4 | 2.3 | 0.05 | 1.4 | 2.3 | 6.5 | 342 | 610 | 700 |
| Comp. Ex. 5 | A | E | A | 0.05 | 0.4 | 0.7 | 0.05 | 0.4 | 0.7 | 6.3 | 342 | 610 | 700 |
| Ex. 4 | A | A | B | 0.2 | 1.6 | 2.2 | 0.2 | 1.6 | 2.2 | 6.4 | 342 | 610 | 700 |
| Ex. 5 | A | A | C | 0.2 | 1.5 | 2.2 | 0.2 | 1.5 | 2.2 | 6.4 | 342 | 610 | 700 |
| Comp. Ex. 6 | A | A | D | 0.2 | 0.8 | 0.9 | 0.2 | 0.8 | 0.9 | 6.5 | 342 | 610 | 700 |
| Comp. Ex. 7 | A | A | E | 0.2 | 1.3 | 1.4 | 0.2 | 1.3 | 1.4 | 6.5 | 342 | 610 | 700 |
| Comp. Ex. 8 | A | A | F | 0.2 | 1.7 | 1.9 | 0.2 | 1.7 | 1.9 | 6.5 | 342 | 610 | 700 |
| Ex. 6 | A | A | G | 0.1 | 1.5 | 2.2 | 0.1 | 1.5 | 2.2 | 6.6 | 342 | 610 | 700 |
| Ex. 7 | A | A | H | 0.1 | 1.4 | 2.1 | 0.1 | 1.4 | 2.1 | 6.6 | 342 | 610 | 700 |
| Ex. 8 | A | A | I | 0.1 | 1.5 | 2.2 | 0.1 | 1.5 | 2.2 | 6.5 | 342 | 610 | 700 |
| Comp. Ex. 9 | T800S | — | — | 0.05 | 1.5 | 2.2 | 0.1 | 1.8 | 2.3 | 5.9 | 309 | 970 | 1020 |
| Comp. Ex. 10 | T700S | — | — | 0.1 | 1.2 | 1.4 | 0.3 | 1.4 | ~1.4 | 5.2 | 245 | 1000 | 1080 |
| Comp. Ex. 11 | IM-9 | — | — | 0.1 | 1.6 | 1.9 | 0.1 | 1.6 | 1.9 | 6.1 | 341 | 900 | 960 |
| Comp. Ex. 12 | IM-10 | — | — | 0.02 | 2.0 | 2.2 | 0.02 | 2.0 | 2.2 | 7.0 | 355 | 900 | 950 |
| Comp. Ex. 13 | IM600 | — | — | 0.04 | 1.2 | 1.7 | 0.1 | 1.6 | 1.7 | 5.6 | 305 | 990 | 1040 |

TABLE 2

| | | | OHT | |
|---|---|---|---|---|
| | Sizing agent-coated carbon fiber | Resin composition | RTD MPa | LTD MPa |
| Example 9 | Example 1 | A | 720 | 728 |
| Comp. Example 14 | Comp. Example 1 | A | 658 | 643 |
| Comp. Example 15 | Comp. Example 2 | A | 674 | 643 |
| Comp. Example 16 | Comp. Example 3 | A | 635 | 627 |
| Comp. Example 17 | Comp. Example 4 | A | 612 | 565 |
| Example 10 | Example 4 | A | 689 | 651 |
| Example 11 | Example 5 | A | 697 | 697 |
| Comp. Example 18 | Comp. Example 6 | A | 674 | 635 |
| Comp. Example 19 | Comp. Example 7 | A | 627 | 627 |
| Comp. Example 20 | Comp. Example 8 | A | 658 | 620 |
| Example 12 | Example 6 | A | 713 | 707 |
| Example 13 | Example 7 | A | 713 | 707 |
| Example 14 | Example 8 | A | 713 | 707 |
| Example 15 | Example 1 | B | 648 | 655 |
| Comp. Example 21 | Comp. Example 1 | B | 593 | 574 |
| Comp. Example 22 | Comp. Example 2 | B | 627 | 598 |
| Comp. Example 23 | Comp. Example 3 | B | 591 | 586 |
| Example 16 | Example 1 | C | 655 | 663 |
| Comp. Example 24 | Comp. Example 1 | C | 599 | 583 |
| Comp. Example 25 | Comp. Example 2 | C | 620 | 591 |
| Comp. Example 26 | Comp. Example 3 | C | 584 | 579 |

Example 17

A monomer mixture comprising 99.4 mol % of acrylonitrile and 0.6 mol % of itaconic acid was polymerized by solution polymerization by using dimethyl sulfoxide for the solvent and 2,2'-azobisisobutyronitrile for the initiator to produce a polyacrylonitrile copolymer. To the thus produced polyacrylonitrile polymer, ammonia gas was introduced until the pH was 9.0 to neutralize the itaconic acid and introduce the ammonium group in the polyacrylonitrile copolymer to thereby prepare a spinning solution having a intrinsic viscosity of 3.4 (corresponding to the weight average molecular weight of 900,000). The resulting spinning solution was then subjected to dry-wet spinning by extruding at 30° C. into air from a spinneret having a diameter of 0.10 mm and a spinneret hole number of 6,000, and the extruded solution was passed through a space of about 4 mm and introduced in a coagulation bath of 35% aqueous solution of dimethyl sulfoxide controlled to 0° C. to obtain a solidified yarn. The solidified yarn was washed with water by the method commonly used in the art, and passed through a hot water bath of 4 tanks by increasing the temperature at an increment of 10° C. from the first bath to the 4th bath at a temperature of 95° C. with the yarn drawn in this process at the total draw ratio of 2.5. To this fiber bundle drawn in the water bath, an amino-modified silicone oil agent was applied, and compacting treatment by drying was conducted by using heating rollers at 160° C. After bringing 2 yarns together so that the single-fiber number was 12,000, the fiber bundle was drawn 3.7 times in high pressure steam so that the total drawing after the spinning was 13 times. The fiber bundle was then interlaced to obtain a polyacrylonitrile precursor fiber comprising 12000 single-fibers each having a single-fiber fineness of 0.41 dtex. The interlacing treatment was conducted by using a fluid spray nozzle having 8 ejection orifices arranged around the fiber bundle so that the fluid spray direction was at 90° with the longitudinal direction of the fiber bundle and each ejection orifice faced another ejection orifice at opposite sides of the fiber bundle forming an ejection orifice pair, and using air for the fluid. In the interlacing, the condition was adjusted so that the tension of the fiber bundle was 3 mN/dtex and the fluid ejection pressure was 0.35 MPa. Next, the fiber bundle was subjected to an oxidation treatment while drawing at a draw ratio of 1.00 in air at a temperature of 250 to 280° C. to obtain an oxidated fiber bundle having a specific gravity of 1.36. The resulting oxidated fiber bundle was subjected to pre-carbonization treatment by drawing at a draw ratio of 1.10 in a nitrogen atmosphere at a temperature of 300 to 800° C. to obtain a pre-carbonized fiber bundle, and the resulting pre-carbonized fiber bundle was subjected to carbonization treatment in a nitrogen atmosphere at the maximum temperature of 1500° C. and at a tension of 9.8 mN/dtex to obtain a carbon fiber.

The thus obtained carbon fiber was subjected to electrolytic surface treatment by using an aqueous solution of ammonium hydrogen carbonate having a concentration of 0.1 mole/l for the electrolyte and at an electric quantity of 80 coulomb per g of the carbon fiber. The electrolytically surface treated carbon fiber was washed with water and dried in heated air at a temperature of 150° C. to obtain a surface treated carbon fiber.

An emulsion in water comprising 10 parts by weight of "jER®" 828 manufactured by Mitsubishi Chemical Corporation, 10 parts by weight of "jER®" 1001 manufactured by Mitsubishi Chemical Corporation, 20 parts by weight of a condensation product of 2 moles of 2 mole EO adduct of bisphenol A, 1.5 moles of maleic acid, and 0.5 mole of sebacic acid, and 10 parts by weight of polyoxyethylene (70 moles) styrenated (5 moles) cumylphenol as an emulsifier was prepared, and this mixture was mixed with 50 parts by weight of "Denacol®" EX-521 manufactured by Nagase ChemteX Corporation to prepare a sizing solution. This sizing agent was coated on the surface treated carbon fiber by dipping, and the coated carbon fiber was heat treated at a temperature of 210° C. for 75 seconds to obtain the sizing agent-coated carbon fiber bundle. The coating weight of the sizing agent was adjusted so that the sizing agent was 1.0 part by weight in relation to 100 parts by weight of the surface treated carbon fiber. The properties of the resulting sizing agent-coated carbon fiber bundle and the results of the OHT test are shown in Table 3.

Example 18

A sizing agent-coated carbon fiber bundle was obtained by repeating the procedure of Example 17 except that the extruding rate of the spinning solution was adjusted so that the single-fiber fineness of the polyacrylonitrile precursor fiber was 0.26 dtex. The properties of the resulting sizing agent-coated carbon fiber bundle and the results of the OHT test are shown in Table 3.

Example 19

A sizing agent-coated carbon fiber bundle was obtained by repeating the procedure of Example 17 except that the extruding rate of the spinning solution was adjusted so that the single-fiber fineness of the polyacrylonitrile precursor fiber was 0.14 dtex. The properties of the resulting sizing agent-coated carbon fiber bundle and the results of the OHT test are shown in Table 3.

Example 20

A sizing agent-coated carbon fiber bundle was obtained by repeating the procedure of Example 17 except that the extruding rate of the spinning solution was adjusted so that the single-fiber fineness of the polyacrylonitrile precursor fiber was 0.60 dtex. The properties of the resulting sizing agent-coated carbon fiber bundle and the results of the OHT test are shown in Table 3.

Example 21

A monomer mixture comprising 99.5 mol % of acrylonitrile and 0.5 mol % of itaconic acid was polymerized by solution polymerization by using dimethyl sulfoxide for the solvent and 2,2'-azobisisobutyronitrile for the initiator to produce a polyacrylonitrile copolymer having a weight average molecular weight of 700,000 and Mz/Mw of 1.8. To the thus produced polyacrylonitrile polymer, ammonia gas was introduced until the pH was 8.5 and polymer concentration was adjusted to 15% by weight to prepare spinning solution. The resulting spinning solution was then subjected to dry-wet spinning by extruding at 40° C. into air from a spinneret having a diameter of 0.15 mm and a spinneret hole number of 6,000, and the extruded solution was passed through a space of about 4 mm and introduced in a coagulation bath of 35% aqueous solution of dimethyl sulfoxide controlled to 3° C. to obtain a solidified yarn. The solidified yarn was washed with water by the method commonly used in the art, and the yarn was then drawn 3.5 times in double hot water bath. To this fiber bundle drawn in the water bath, an amino-modified silicone oil agent was applied, and a compacting treatment by drying was conducted by using heating rollers at 160° C. After bringing 2 yarns together so that the single-fiber number was 12,000, the fiber bundle was drawn 3.7 times in high pressure steam so that the total drawing after the spinning was 13 times. The fiber bundle was then interlaced to obtain a polyacrylonitrile precursor fiber comprising 12000 single-fibers each having a single-fiber fineness of 0.70 dtex. The interlacing treatment was conducted by using a fluid spray nozzle having 8 ejection orifices arranged around the fiber bundle so that the fluid spray direction was at 90° with the longitudinal direction of the fiber bundle and each ejection orifice faced another ejection orifice at opposite sides of the fiber bundle forming an ejection orifice pair, and using air for the fluid. In the interlacing, the condition was adjusted so that the tension of the fiber bundle was 3 mN/dtex and the fluid ejection pressure was 0.35 MPa. Next, the fiber bundle was subjected to an oxidation treatment while drawing at a draw ratio of 1 in air at a temperature of 240 to 260° C. to obtain an oxidated fiber bundle having a specific gravity of 1.35 to 1.36. The resulting oxidated fiber bundle was subjected to pre-carbonization treatment by drawing at a draw ratio of 1.15 in a nitrogen atmosphere at a temperature of 300 to 800° C. to obtain a pre-carbonized fiber bundle, and the resulting pre-carbonized fiber bundle was subjected to carbonization treatment in a nitrogen atmosphere at the maximum temperature of 1500° C. and at a tension of 5.5 mN/dtex to obtain a carbon fiber.

The thus obtained carbon fiber was subjected to electrolytic surface treatment by using an aqueous solution of ammonium hydrogen carbonate having a concentration of 0.1 mole/l for the electrolyte and at an electric quantity of 80 coulomb per g of the carbon fiber. The electrolytically surface treated carbon fiber was washed with water and dried in heated air at a temperature of 150° C. to obtain a surface treated carbon fiber.

An emulsion in water comprising 20 parts by weight of component (A), 20 parts by weight of a condensation product of 2 moles of 2 mole EO adduct of bisphenol A, 1.5 moles of maleic acid, and 0.5 mole of sebacic acid, and 10 parts by weight of polyoxyethylene (70 moles) styrenated (5 moles) cumylphenol as an emulsifier was prepared, and this mixture was mixed with 50 parts by weight of the component (B) to prepare a sizing solution. This sizing agent was coated on the surface treated carbon fiber by dipping, and the coated carbon fiber was heat treated at a temperature of 210° C. for 75 seconds to obtain the sizing agent-coated carbon fiber bundle. The coating weight of the sizing agent was adjusted so that the sizing agent was 1.0 part by weight in relation to 100 parts by weight of the surface treated carbon fiber. The properties of the resulting sizing agent-coated carbon fiber bundle and the results of the OHT test are shown in Table 3.

Example 22

A sizing agent-coated carbon fiber bundle was obtained by repeating the procedure of Example 21 except that the extruding rate of the spinning solution was adjusted so that the single-fiber fineness of the polyacrylonitrile precursor fiber was 0.62 dtex. The properties of the resulting sizing agent-coated carbon fiber bundle and the results of the OHT test are shown in Table 3.

Comparative Example 27

A sizing agent-coated carbon fiber bundle was obtained by repeating the procedure of Example 17 except that, for the sizing agent, the amount of "jER®" 828 manufactured by Mitsubishi Chemical Corporation, "jER®" 1001 manufactured by Mitsubishi Chemical Corporation, the condensation product of 2 moles of 2 mole EO adduct of bisphenol A, 1.5 moles of maleic acid, and 0.5 mole of sebacic acid, and 10 parts by weight of "Denacol®" EX-521 manufactured by Nagase ChemteX Corporation was changed from 10 parts by weight: 10 parts by weight: 20 parts by weight: 50 parts by weight to 22.5 parts by weight: 22.5 parts by weight: 45 parts by weight: 0. The properties of the resulting sizing agent-coated carbon fiber bundle and the results of the OHT test are shown in Table 3.

Comparative Example 28

A sizing agent-coated carbon fiber bundle was obtained by repeating the procedure of Comparative Example 27 except that the extruding rate of the spinning solution was adjusted so that the single-fiber fineness of the polyacrylonitrile precursor fiber was 0.14 dtex. The properties of the resulting sizing agent-coated carbon fiber bundle and the results of the OHT test are shown in Table 3.

Comparative Example 29

In the production process of the polyacrylonitrile precursor fiber, a sizing agent-coated carbon fiber bundle was obtained by repeating the procedure of Example 19 except that the interlacing treatment was not conducted. The properties of the resulting sizing agent-coated carbon fiber bundle and the results of the OHT test are shown in Table 3.

Comparative Example 30

In the production process of the polyacrylonitrile precursor fiber, a sizing agent-coated carbon fiber bundle was obtained by repeating the procedure of Example 19 except that the interlacing treatment was not conducted. The properties of the resulting sizing agent-coated carbon fiber bundle and the results of the OHT test are shown in Table 3.

Comparative Example 31

Commercially available "Torayca®" T800S manufactured by Toray Industries, Inc. was analyzed. The properties of the carbon fiber bundle are shown in Table 3.

Comparative Example 32

Commercially available "TENAX®" IM600 (manufactured by Toho Tenax Co., Ltd.) was analyzed. The properties of the carbon fiber bundle are shown in Table 3.

As indicated in Table 3, the number of fiber breaks at an apparent single-fiber stress of 10.0 GPa tends to be smaller at the higher tensile strength of resin-impregnated strands, and the OHT particularly in the low temperature test tends to be higher at the smaller number of fiber breaks at an apparent single-fiber stress of at 12.2 GPa. "Hexply®" IM-10/M91 which has largest catalog value of the OHT (under the room temperature condition) in commercially available prepregs had the OHT of approximately 600 MPa (=88 ksi).

TABLE 3

| | | Tearable length | | | | Tensile | | | | | |
|---|---|---|---|---|---|---|---|---|---|---|---|
| | Inter-lacing treatment | Pre-carbonized fiber bundle mm | Carbon fiber bundle mm | Single-fiber diameter μm | Sizing diameter (a)/(b) — | Fragmentation method, number of fiber breaks σ | | | strength of resin-impregnated strands GPa | Single-fiber modulus GPa | OHT | |
| | | | | | | 10.0 GPa/m | 12.2 GPa/m | 15.3 GPa/m | | | RTD MPa | LTD MPa |
| Ex. 17 | Yes | 590 | 670 | 3.7 | 0.64 | 0.5 | 1.1 | 2.1 | 7.6 | 358 | 731 | 722 |
| Ex. 18 | Yes | 550 | 640 | 2.9 | 0.64 | 0.4 | 1.0 | 2.7 | 7.7 | 358 | 741 | 735 |
| Ex. 19 | Yes | 535 | 620 | 2.2 | 0.64 | 0.3 | 0.8 | 3.3 | 7.1 | 358 | 748 | 740 |
| Ex. 20 | Yes | 630 | 710 | 4.5 | 0.64 | 0.9 | 1.3 | 2.0 | 7.1 | 358 | 710 | 678 |
| Ex. 21 | Yes | 670 | 750 | 5.4 | 0.64 | 1.0 | 1.6 | 2.1 | 6.4 | 342 | 668 | 631 |
| Ex. 22 | Yes | 660 | 740 | 4.8 | 0.64 | 0.9 | 1.5 | 2.1 | 6.9 | 342 | 673 | 639 |
| Comp. Ex. 27 | Yes | 590 | 670 | 3.7 | 1.01 | 0.3 | 0.8 | 1.4 | 7.6 | 358 | 652 | 643 |
| Comp. Ex. 28 | Yes | 550 | 630 | 2.2 | 1.01 | 0.2 | 0.5 | 1.2 | 7.1 | 358 | 657 | 649 |

TABLE 3-continued

| | | Tearable length | | | | Fragmentation method, number of fiber breaks σ | | | Tensile strength of resin-impregnated | Single-fiber | OHT | |
|---|---|---|---|---|---|---|---|---|---|---|---|---|
| | Inter-lacing | Pre-carbonized fiber | Carbon fiber | Single-fiber | Sizing diameter | | | | | | | |
| | treat-ment | bundle mm | bundle mm | diameter μm | (a)/(b) | 10.0 GPa/m | 12.2 GPa/m | 15.3 GPa/m | strands GPa | modulus GPa | RTD MPa | LTD MPa |
| Comp. Ex. 29 | No | 960 | 1010 | 3.7 | 0.64 | 1.2 | 2.0 | 2.8 | 7.3 | 358 | 612 | 573 |
| Comp. Ex. 30 | No | 920 | 980 | 2.2 | 0.64 | 1.0 | 1.8 | 3.4 | 6.8 | 358 | 637 | 604 |
| Comp. Ex. 31 (T800S) | — | 970 | 1020 | 5.4 | — | 1.3 | 1.8 | 2.3 | 6.0 | 309 | — | — |
| Comp. Ex. 32 (IM600) | — | 990 | 1040 | 5.0 | — | 1.0 | 1.6 | 1.7 | 5.6 | 305 | — | — |

Example 23

A monomer mixture comprising 99.5 mol % of acrylonitrile and 0.5 mol % of itaconic acid was polymerized by solution polymerization by using dimethyl sulfoxide for the solvent and 2,2'-azobisisobutyronitrile for the initiator to produce a polyacrylonitrile copolymer. To the thus produced polyacrylonitrile polymer, ammonia gas was introduced until the pH was 8.5 to neutralize the itaconic acid and introduce the ammonium group in the polyacrylonitrile copolymer to thereby prepare a spinning dope solution. The resulting spinning dope solution was then subjected to dry-wet spinning by extruding at 40° C. into air from a spinneret having a diameter of 0.15 mm and a spinneret hole number of 6,000, and the extruded solution was passed through a space of about 4 mm and introduced in a coagulation bath of 35% aqueous solution of dimethyl sulfoxide controlled to 3° C. to obtain a solidified yarn. The solidified yarn was washed with water by the method commonly used in the art, and the yarn was then drawn 3.5 times in double hot water bath. The solidified yarn was washed with water by the method commonly used in the art, and the yarn was then drawn 3.5 times in double hot water bath. This fiber bundle drawn in the water bath was subjected to a fluid interlace treatment under the conditions shown in Table 4 by using air for the fluid, and after applying an amino-modified silicone oil agent, compacting treatment by drying was conducted by using heating rollers at 160° C. The fiber bundle was then drawn 3.7 times in high pressure steam so that the total drawing after the spinning was 13 times to obtain a polyacrylonitrile precursor fiber comprising 6000 single-fibers each having a single-fiber fineness of 0.7 dtex. Next, the resulting 2 acryl fibers were brought together so that the single-fiber number was 12,000, and the yarn was drawn in air at a temperature of 240 to 260° C. at a draw ratio of 1 for oxidation to thereby obtain an oxidated fiber bundle having a specific gravity of 1.35 to 1.36. The resulting oxidated fiber bundle was subjected to pre-carbonization treatment by drawing at a draw ratio of 1.15 in a nitrogen atmosphere at a temperature of 300 to 800° C. to obtain a pre-carbonized fiber bundle, and the resulting pre-carbonized fiber bundle was subjected to carbonization treatment in a nitrogen atmosphere at the maximum temperature of 1500° C. and at a tension shown in Table 5 to obtain a carbon fiber. The thus obtained carbon fiber was subjected to electrolytic surface treatment by using an aqueous solution of sulfuric acid having a concentration of 0.1 mole/l for the electrolyte, and the carbon fiber was washed with water and dried at 150° C. A sizing agent was then applied to obtain a substantially non-twisted sizing agent-coated carbon fiber bundle having a good quality. The conditions used in the production and the properties of the resulting carbon fiber bundle are shown in Tables 4 and 5.

Example 24

A sizing agent-coated carbon fiber bundle was obtained by repeating the procedure of Example 23 except that the carbonization tension in the carbonization treatment was changed to 14.7 mN/dtex. The carbon fiber bundle exhibited reduced number of broken single-filaments and good quality, and the tensile modulus of resin-impregnated strands was improved to 364 GPa. The conditions used in the production and the properties of the resulting carbon fiber bundle are shown in Tables 4 and 5.

Example 25

A sizing agent-coated carbon fiber bundle was obtained by repeating the procedure of Example 23 except that the carbonization tension in the carbonization treatment was changed to 18.6 mN/dtex. The carbon fiber bundle exhibited reduced number of broken single-filaments and good quality, and the tensile modulus of resin-impregnated strands was improved to 378 GPa. The conditions used in the production and the properties of the resulting carbon fiber bundle are shown in Tables 4 and 5.

Comparative Example 33

A sizing agent-coated carbon fiber bundle was obtained by repeating the procedure of Example 23 except that the fluid interlacing treatment of the polyacrylonitrile precursor fiber was not conducted. The carbon fiber bundle exhibited increased number of broken single-filaments and greatly deteriorated quality, and the tensile strength of resin-impregnated strands was reduced to 5500 MPa. The conditions used in the production and the properties of the resulting carbon fiber bundle are shown in Tables 4 and 5.

Comparative Example 34

A monomer mixture comprising 99.5 mol % of acrylonitrile and 0.5 mol % of itaconic acid was polymerized by solution polymerization by using dimethyl sulfoxide for the solvent and 2,2'-azobisisobutyronitrile for the initiator to produce a polyacrylonitrile copolymer. To the thus produced polyacrylonitrile polymer, ammonia gas was introduced until the pH was 8.5 to neutralize the itaconic acid and introduce the ammonium group in the polyacrylonitrile copolymer to thereby prepare a spinning dope solution. The resulting spinning dope solution was then subjected to dry-wet spinning by extruding at 40° C. into air from a spinneret having a diameter of 0.15 mm and a spinneret hole number of 6,000, and the extruded solution was passed through a space of about 4 mm and introduced in a coagulation bath of 35% aqueous solution of dimethyl sulfoxide controlled to 3° C. to obtain a solidified yarn. The solidified yarn was washed with water by the method commonly used in the art, and the yarn was then drawn 3.5 times in double hot water bath. To this fiber bundle drawn in the water bath, an amino-modified silicone oil agent was applied, and a compacting treatment by drying was conducted by using heating rollers at 160° C. The fiber bundle was then drawn 3.7 times in high pressure steam so that the total drawing after the spinning was 13 times to obtain a polyacrylonitrile precursor fiber bundle having a single-fiber fineness of 0.7 dtex and a single-fiber number of 6000. Next, this polyacrylonitrile precursor fiber bundle was subjected to a fluid interlacing treatment using air for the fluid under the conditions shown in Table 4, and the yarns were brought together so that the single-fiber number was 12,000 to obtain a sizing agent-coated carbon fiber bundle by the procedure similar to Example 23. The carbon fiber bundle exhibited increased number of broken single-filaments and greatly deteriorated quality, and the tensile strength of resin-impregnated strands was reduced to 5850 MPa. The conditions used in the production and the properties of the resulting carbon fiber bundle are shown in Tables 4 and 5.

Comparative Example 35

The procedure of Comparative Example 34 was repeated except that the carbonization tension in the carbonization treatment was changed to 14.7 mN/dtex in an attempt to produce a sizing agent-coated carbon fiber bundle. However, a high quality carbon fiber bundle could not be obtained due to frequent occurrence of fiber breakage in the carbonization process. The conditions used in the production and the properties of the resulting carbon fiber bundle are shown in Tables 4 and 5.

Example 26

A monomer mixture comprising 99.5 mol % of acrylonitrile and 0.5 mol % of itaconic acid was polymerized by solution polymerization by using dimethyl sulfoxide for the solvent and 2,2'-azobisisobutyronitrile for the initiator to produce a polyacrylonitrile copolymer. To the thus produced polyacrylonitrile polymer, ammonia gas was introduced until the pH was 8.5 to neutralize the itaconic acid and introduce the ammonium group in the polyacrylonitrile copolymer to thereby prepare a spinning dope solution. The resulting spinning dope solution was then subjected to dry-wet spinning by extruding at 40° C. into air from a spinneret having a diameter of 0.15 mm and a spinneret hole number of 6,000, and the extruded solution was passed through a space of about 4 mm and introduced in a coagulation bath of 35% aqueous solution of dimethyl sulfoxide controlled to 3° C. to obtain a solidified yarn. The solidified yarn was washed with water by the method commonly used in the art, and the yarn was then drawn 3.5 times in double hot water bath. To this fiber bundle drawn in the water bath, an amino-modified silicone oil agent was applied, and a compacting treatment by drying was conducted by using heating rollers at 160° C. The fiber bundle was then drawn 3.7 times in high pressure steam so that the total drawing after the spinning was 13 times to obtain a polyacrylonitrile precursor fiber bundle having a single-fiber fineness of 0.7 dtex and a single-fiber number of 6000. Next, the resulting acryl fiber was drawn in air at a temperature of 240 to 260° C. at a draw ratio of 1 for oxidation to thereby obtain an oxidated fiber bundle having a specific gravity of 1.35 to 1.36. The resulting oxidated fiber bundle was subjected to a pre-carbonization treatment by drawing at a draw ratio of 1.15 in a nitrogen atmosphere at a temperature of 300 to 800° C., and after conducting a fluid interlacing treatment under the conditions shown in Table 4 by using air for the fluid, the yarns were brought together so that the single-fiber number was 12,000 to obtain a pre-carbonized fiber bundle. The resulting pre-carbonized fiber bundle was subjected to carbonization treatment in a nitrogen atmosphere at the maximum temperature of 1500° C. and at a tension shown in Table 4 to obtain a carbon fiber. The thus obtained carbon fiber was subjected to electrolytic surface treatment by using an aqueous solution of sulfuric acid having a concentration of 0.1 mole/l for the electrolyte, and the carbon fiber was washed with water and dried at 150° C. A sizing agent was then applied to obtain a substantially non-twisted sizing agent-coated carbon fiber bundle having a good quality. The conditions used in the production and the properties of the resulting carbon fiber bundle are shown in Tables 4 and 5.

Example 27

A sizing agent-coated carbon fiber bundle was obtained by repeating the procedure of Example 26 except that the carbonization tension in the carbonization treatment was changed to 14.7 mN/dtex. The resulting carbon fiber bundle exhibited reduced number of broken single-filaments and good quality, and the tensile modulus of resin-impregnated strands was improved to 365 GPa. The conditions used in the production and the properties of the resulting carbon fiber bundle are shown in Tables 4 and 5.

Comparative Example 36

The procedure of Example 27 was repeated except that the carbonization tension in the carbonization treatment was changed to 18.6 mN/dtex in an attempt to produce a sizing agent-coated carbon fiber bundle. However, a high quality carbon fiber bundle could not be obtained due to frequent occurrence of fiber breakage in the carbonization process. The conditions used in the production and the properties of the resulting carbon fiber bundle are shown in Tables 4 and 5.

Comparative Example 37

A sizing agent-coated carbon fiber bundle was obtained by repeating the procedure of Example 23 except that the carbonization temperature in the carbonization treatment was changed to 2300° C. The resulting carbon fiber bundle had a reduced number of broken single-filaments and good quality with improved tensile modulus of resin-impregnated strands of 377 GPa and reduced tensile strength of resin-impregnated strands of 4560 MPa. The conditions used in the production and the properties of the resulting carbon fiber bundle are shown in Tables 4 and 5.

Example 28

A sizing agent-coated carbon fiber bundle was obtained by repeating the procedure of Example 23 except that the fluid interlacing treatment was conducted by using air for the fluid and conducting the treatment under the conditions shown in Table 4, and the carbonization tension in the carbonization treatment was changed to 19.1 mN/dtex. While the resulting carbon fiber bundle had somewhat increased number of broken single-filaments and slightly reduced quality with improved tensile modulus of resin-impregnated strands of 384 GPa, the tensile strength of resin-impregnated strands was slightly reduced to 5900 MPa. The conditions used in the production and the properties of the resulting carbon fiber bundle are shown in Tables 4 and 5.

Example 29

A sizing agent-coated carbon fiber bundle was obtained by repeating the procedure of Example 23 except that the fluid interlacing treatment was conducted by using air for the fluid and conducting the treatment under the conditions shown in Table 4, and the carbonization tension in the carbonization treatment was changed to 19.5 mN/dtex. While the resulting carbon fiber bundle had somewhat increased number of broken single-filaments and slightly reduced quality with improved tensile modulus of resin-impregnated strands of 386 GPa, the tensile strength of resin-impregnated strands was slightly reduced to 5900 MPa. The conditions used in the production and the properties of the resulting carbon fiber bundle are shown in Tables 4 and 5.

Example 30

A sizing agent-coated carbon fiber bundle was obtained by repeating the procedure of Example 23 except that the filament number in the fluid interlacing treatment was changed to 12000. The resulting carbon fiber bundle exhibited a somewhat increased number of broken single-filaments. The conditions used in the production and the properties of the resulting carbon fiber bundle are shown in Tables 4 and 5.

Example 31

A sizing agent-coated carbon fiber bundle was obtained by repeating the procedure of Example 28 except that the carbonization tension in the carbonization treatment was changed to 11.8 mN/dtex. The resulting carbon fiber bundle exhibited a somewhat increased number of broken single-filaments and an improved tensile modulus of resin-impregnated strands of 351 GPa. The conditions used in the production and the properties of the resulting carbon fiber bundle are shown in Tables 4 and 5.

Comparative Example 38

A sizing agent-coated carbon fiber bundle was obtained by repeating the procedure of Example 30 except that the filament number in the fluid interlacing treatment was changed to 24000. The resulting carbon fiber bundle exhibited an increased number of broken single-filaments with greatly reduced quality, and the tensile strength of resin-impregnated strands was reduced to 5700 MPa. The conditions used in the production and the properties of the resulting carbon fiber bundle are shown in Tables 4 and 5.

Comparative Example 39

The procedure of Comparative Example 38 was repeated except that the carbonization tension in the carbonization treatment was changed to 11.8 mN/dtex in an attempt to produce a sizing agent-coated carbon fiber bundle. However, a high quality carbon fiber bundle could not be obtained due to frequent occurrence of fiber breakage in the carbonization process. The conditions used in the production and the properties of the resulting carbon fiber bundle are shown in Tables 4 and 5.

TABLE 4

| | | Interlacing treatment | | | | Precursor fiber bundle | Pre-carbonized fiber bundle | | |
|---|---|---|---|---|---|---|---|---|---|
| | Process | Coefficient of kinetic friction — | Tension mN/dtex | Pressure MPa-G | Filament Number filaments | Average tearable length mm | Average tearable length mm | Proportion of "at least 800 mm" % | CF value — |
| Ex. 23 | Water bath drawing (before applying the oiling agent) | 0.51 | 2 | 0.35 | 6000 | 140 | 210 | 0 | 10.0 |
| Ex. 24 | Water bath drawing (before applying the oiling agent) | 0.51 | 2 | 0.35 | 6000 | 140 | 210 | 0 | 10.0 |
| Ex. 25 | Water bath drawing (before applying the oiling agent) | 0.51 | 2 | 0.35 | 6000 | 140 | 210 | 0 | 10.0 |
| Comp. Ex. 33 | — | — | — | — | — | 710 | 770 | 73 | 10.0 |
| Comp. Ex. 34 | Precursor fiber bundle (after applying the oiling agent) | 0.2 | 2 | 0.35 | 6000 | 550 | 640 | 60 | 10.0 |
| Comp. Ex. 35 | Precursor fiber bundle (after applying the oiling agent) | 0.2 | 2 | 0.35 | 6000 | 550 | 640 | 60 | 10.0 |
| Ex. 26 | Pre-carbonized fiber bundle | 0.37 | 2 | 0.35 | 6000 | 750 | 370 | 0 | 11.0 |

TABLE 4-continued

|  | Interlacing treatment | | | | Precursor fiber bundle | Pre-carbonized fiber bundle | | |
|---|---|---|---|---|---|---|---|---|
|  | Process | Coefficient of kinetic friction — | Tension mN/dtex | Pressure MPa-G | Filament Number filaments | Average tearable length mm | Average tearable length mm | Proportion of "at least 800 mm" % | CF value — |
| Ex. 27 | Pre-carbonized fiber bundle | 0.37 | 2 | 0.35 | 6000 | 750 | 370 | 0 | 11.0 |
| Comp. Ex. 36 | Pre-carbonized fiber bundle | 0.37 | 2 | 0.35 | 6000 | 750 | 370 | 0 | 11 |
| Comp. Ex. 37 | Water bath drawing (before applying the oiling agent) | 0.51 | 2 | 0.35 | 6000 | 140 | 210 | 0 | 10 |
| Ex. 28 | Water bath drawing (before applying the oiling agent) | 0.51 | 0.5 | 0.35 | 6000 | 120 | 170 | 3 | 10 |
| Ex. 29 | Water bath drawing (before applying the oiling agent) | 0.51 | 2 | 1 | 6000 | 110 | 160 | 3 | 11 |
| Ex. 30 | Water bath drawing (before applying the oiling agent) | 0.51 | 2 | 0.35 | 12000 | 380 | 440 | 17 | 11 |
| Ex. 31 | Water bath drawing (before applying the oiling agent) | 0.51 | 2 | 0.35 | 12000 | 380 | 440 | 17 | 11 |
| Comp. Ex. 38 | Water bath drawing (before applying the oiling agent) | 0.51 | 2 | 0.35 | 24000 | 560 | 630 | 60 | 10 |
| Comp. Ex. 39 | Water bath drawing (before applying the oiling agent) | 0.51 | 2 | 0.35 | 24000 | 560 | 630 | 60 | 10 |

TABLE 5

|  | Carbonization temperature ° C. | Carbonization tension mN/dtex | Average tearable length mm | Proportion of "at least 800 mm" % | CF value — | Tensile strength of resin-impregnated strands GPa | Tensile modulus of resin-impregnated strands GPa | Number of single-fiber breaks/m | 10 m bundle strength GPa | Crystallite size nm | OHT RTD Mpa |
|---|---|---|---|---|---|---|---|---|---|---|---|
| Ex. 23 | 1500 | 9.8 | 320 | 0 | 8 | 6.3 | 342 | 1 | 3.5 | 1.9 | 635 |
| Ex. 24 | 1500 | 14.7 | 320 | 0 | 8 | 6.2 | 364 | 1 | 3.5 | 1.9 | 630 |
| Ex. 25 | 1500 | 18.6 | 320 | 0 | 8 | 6.3 | 378 | 1.5 | 3.5 | 1.9 | 635 |
| Comp. Ex. 33 | 1500 | 9.8 | 850 | 77 | 7 | 5.5 | 341 | 35 | 1.7 | 1.9 | 530 |
| Comp. Ex. 34 | 1500 | 9.8 | 730 | 57 | 8 | 5.9 | 342 | 30 | 1.8 | 1.9 | 570 |
| Comp. Ex. 35 | 1500 | 14.7 | — | — | — | — | — | — | — | — | — |
| Ex. 26 | 1500 | 9.8 | 450 | 3 | 8 | 6.2 | 343 | 1 | 3.0 | 1.9 | 620 |
| Ex. 27 | 1500 | 14.7 | 450 | 3 | 8 | 6.2 | 365 | 1.5 | 3.0 | 1.9 | 615 |
| Comp. Ex. 36 | 1500 | 18.6 | — | — | — | — | — | — | — | — | — |
| Comp. Ex. 37 | 2300 | 9.8 | 320 | 0 | 7 | 4.6 | 377 | 1.5 | 0.8 | 3.7 | 450 |
| Ex. 28 | 1500 | 19.1 | 310 | 3 | 8 | 5.9 | 384 | 3 | 3.6 | 1.9 | 620 |
| Ex. 29 | 1500 | 19.5 | 300 | 7 | 8 | 5.9 | 386 | 3 | 3.6 | 1.9 | 625 |
| Ex. 30 | 1500 | 9.8 | 510 | 17 | 8 | 6.2 | 341 | 3 | 2.5 | 1.9 | 600 |
| Ex. 31 | 1500 | 11.8 | 510 | 17 | 8 | 6.2 | 351 | 3 | 2.5 | 1.9 | 605 |
| Comp. Ex. 38 | 1500 | 9.8 | 710 | 77 | 7 | 5.7 | 342 | 30 | 1.8 | 1.9 | 560 |
| Comp. Ex. 39 | 1500 | 11.8 | — | — | — | — | — | — | — | — | — |

INDUSTRIAL APPLICABILITY

When the prepreg is used, the carbon fiber composite material obtained by the curing exhibits well balanced mechanical properties including tensile modulus and open hole tensile strength, and accordingly, it greatly contributes to the weight reduction of aircraft and, hence, in the improvement of the specific fuel consumption of the aircraft.

The invention claimed is:

1. A carbon fiber bundle comprising a sizing agent containing an aliphatic epoxy compound (C) and an aromatic epoxy compound (D) coated on the carbon fiber bundle, wherein carbon fiber in the carbon fiber bundle exhibits, when measured by a single-fiber composite fragmentation method, a number of fiber breaks of at least 2.0/mm when apparent single-fiber stress is 15.3 GPa and the number of fiber breaks of up to 1.7/mm when the apparent single-fiber stress is 12.2 GPa.

2. The carbon fiber bundle according to claim 1, wherein the number of fiber breaks is up to 1.3/mm when the apparent single-fiber stress is 12.2 GPa.

3. The carbon fiber bundle according to claim 1, wherein, when measured by the single-fiber composite fragmentation method, the number of fiber breaks is up to 1.0/mm when the apparent single-fiber stress is 12.2 GPa.

4. The carbon fiber bundle according to claim 1, wherein, when measured by the single-fiber composite fragmentation method, the number of fiber breaks is up to 0.8/mm when the apparent single-fiber stress is 10.0 GPa.

5. The carbon fiber bundle according to claim 1, wherein, when a surface of the sizing agent coated on the carbon fiber is measured by X-ray photoelectron spectroscopy at a photoelectron takeoff angle of 15°, a ratio (a)/(b) of (a) height of the component in the C1s inner shell spectrum corresponding to a binding energy of 284.6 eV to (b) a height of the component in the C1s inner shell spectrum corresponding to the binding energy of 286.1 eV is 0.50 to 0.90.

6. The carbon fiber bundle according to claim 1, having an average tearable length of 300 to 710 mm and which is substantially non-twisted.

7. The carbon fiber bundle according to claim 6, wherein, when the tearable length of the carbon fiber bundle is measured, proportion of the carbon fiber bundle having the tearable length of at least 800 mm is up to 15%.

8. A prepreg containing a thermosetting resin containing the carbon fiber bundle according to claim 1, an epoxy compound (A), and an aromatic amine curing agent (B).

9. A carbon fiber bundle comprising a sizing agent coated on the carbon fiber bundle, wherein carbon fiber in the carbon fiber bundle exhibits, when measured by a single-fiber composite fragmentation method, a number of fiber breaks of at least 2.0/mm when apparent single-fiber stress is 15.3 GPa and the number of fiber breaks of up to 1.3/mm when the apparent single-fiber stress is 12.2 GPa.

10. The carbon fiber bundle according to claim 9, wherein, when measured by the single-fiber composite fragmentation method, the number of fiber breaks is up to 0.8/mm when the apparent single-fiber stress is 10.0 GPa.

11. The carbon fiber bundle according to claim 9, wherein, when the surface of the sizing agent coated on the carbon fiber is measured by X-ray photoelectron spectroscopy at a photoelectron takeoff angle of 15°, a ratio (a)/(b) of (a) a height of the component in the C1s inner shell spectrum corresponding to a binding energy of 284.6 eV to (b) a height of the component in the C1s inner shell spectrum corresponding to the binding energy of 286.1 eV is 0.50 to 0.90.

12. A carbon fiber bundle comprising a sizing agent coated on the carbon fiber bundle having an average tearable length of 300 to 710 mm, a tensile strength of resin-impregnated strands of at least 5900 MPa, a tensile modulus of resin-impregnated strands of at least 320 GPa, and a number of broken single-filaments of 0.5 to 3/m, and which is substantially non-twisted.

13. The carbon fiber bundle according to claim 12, wherein, when the tearable length of the carbon fiber bundle is measured, a proportion of the carbon fiber bundle having the tearable length of at least 800 mm is up to 15%.

14. A method of producing a carbon fiber bundle comprising subjecting a precursor fiber bundle comprising a polyacrylonitrile polymer to an oxidation process, a pre-carbonization process, and a carbonization process to obtain a carbon fiber bundle, wherein the carbonization process is conducted in an inert atmosphere at a temperature of 1200 to 2000° C. so that tension applied to the pre-carbonized fiber bundle produced by the pre-carbonization in the carbonization process satisfies relation (1):

$$9.8 \leq \text{tension in the carbonization process (mN/dtex)} \leq -0.0225 \times (\text{average tearable length of the pre-carbonized fiber bundle (mm)}) + 23.5 \quad (1),$$

wherein the pre-carbonized fiber bundle is substantially non-twisted, and the pre-carbonized fiber bundle has an average tearable length of 150 to 620 mm.

* * * * *